US012287561B2

(12) United States Patent
Kaya

(10) Patent No.: US 12,287,561 B2
(45) Date of Patent: Apr. 29, 2025

(54) PRINTER AND DIGITAL CAMERA INCLUDING PRINTER

(71) Applicant: FUJIFILM Corporation, Tokyo (JP)

(72) Inventor: Akimasa Kaya, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/493,103

(22) Filed: Oct. 24, 2023

(65) Prior Publication Data

US 2024/0134264 A1 Apr. 25, 2024
US 2024/0231213 A9 Jul. 11, 2024

(30) Foreign Application Priority Data

Oct. 25, 2022 (JP) .................................. 2022-170655

(51) Int. Cl.
*G03B 27/62* (2006.01)
*G03B 27/14* (2006.01)

(52) U.S. Cl.
CPC ......... *G03B 27/6257* (2013.01); *G03B 27/14* (2013.01)

(58) Field of Classification Search
CPC ............................ G03B 27/6257; G03B 27/14
See application file for complete search history.

(56) References Cited

U.S. PATENT DOCUMENTS 4,172,647 A * 10/1979 Gold ...................... G03B 17/04
396/39
4,249,811 A 2/1981 Douglas
6,330,397 B1 12/2001 Johnson et al.
2005/0286878 A1 12/2005 Takagi et al.
2018/0231893 A1 8/2018 Sugiyama
2023/0259008 A1 8/2023 Kaya

FOREIGN PATENT DOCUMENTS

JP H07-152087 A 6/1995
JP 4052543 B2 2/2008
WO WO-2022092028 A1 * 5/2022 ............. G03B 17/52

OTHER PUBLICATIONS

The extended European search report issued by the European Patent Office on Mar. 20, 2024, which corresponds to European Patent Application No. 23205686.1-1020 and is related to U.S. Appl. No. 18/493,103.

* cited by examiner

*Primary Examiner* — Minh Q Phan
(74) *Attorney, Agent, or Firm* — Studebaker Brackett PLLC

(57) ABSTRACT

A digital camera including a printer includes a transport roller pair that transports an instant film, an exposure unit that exposes an image onto the instant film, a spreading roller pair that spreads a developer into a gap of the instant film by crushing a developer pod of the exposed instant film, a spreading control member that is positioned between the transport roller pair and the spreading roller pair, extends in a width direction of the instant film, and controls the developer spread into the gap, and a mechanical switch that is positioned near the spreading control member.

10 Claims, 26 Drawing Sheets

FIG. 18
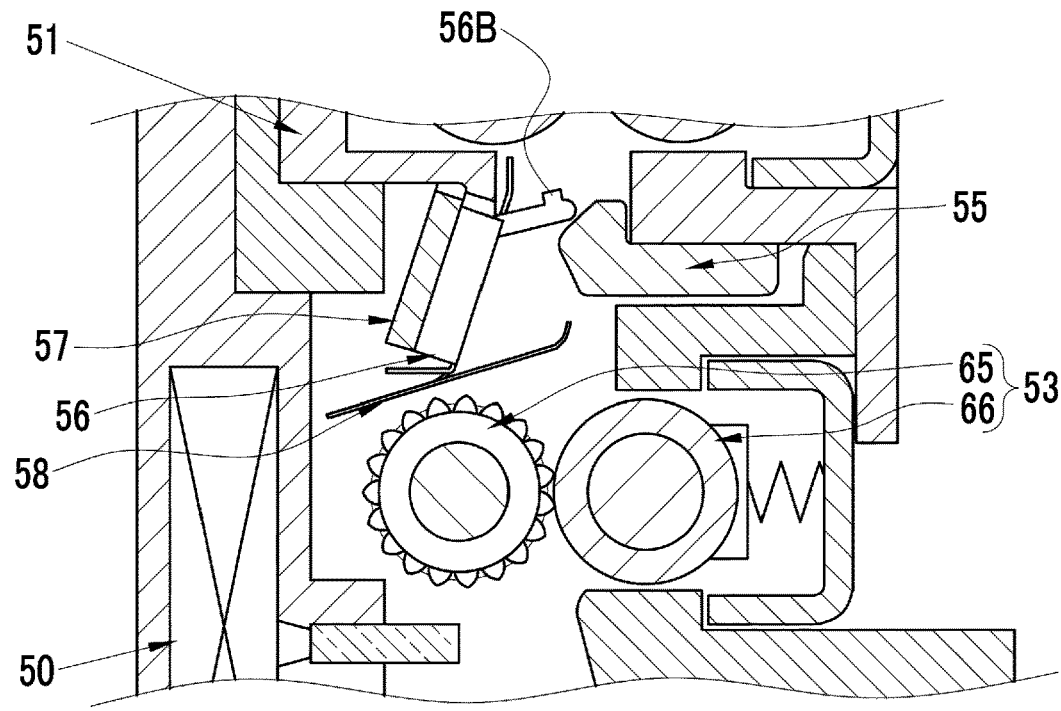
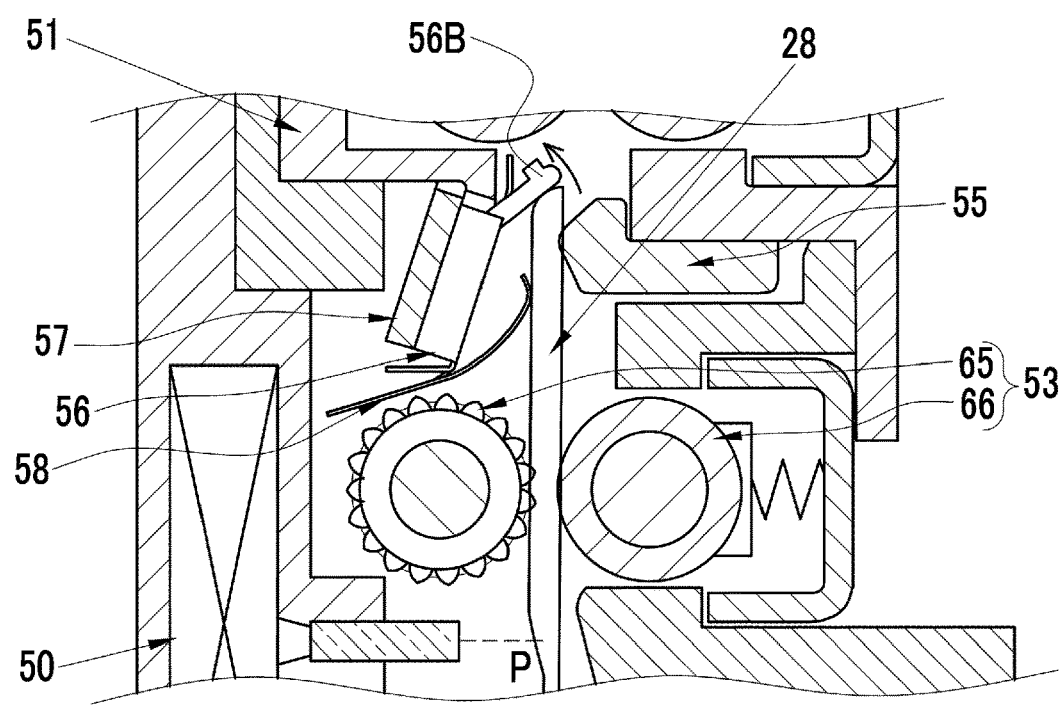

PRINTER AND DIGITAL CAMERA INCLUDING PRINTER

CROSS-REFERENCE TO RELATED APPLICATIONS

This application claims priority under 35 U.S.C. § 119(a) to Japanese Patent Application No. 2022-170655 filed on 25 Oct. 2022. The above application is hereby expressly incorporated by reference, in its entirety, into the present application.

BACKGROUND OF THE INVENTION

1. Field of the Invention

The present invention relates to a printer and a digital camera including a printer.

2. Description of the Related Art

A printer described in JP4052543 drives a linear exposure head provided in an orientation orthogonal to a transport direction thereof to record an image on an instant film while transporting the instant film in a discharge direction. This printer comprises a spreading roller that is provided on a downstream side of the exposure head, crushes a developer pod of the instant film and feeds the instant film in the discharge direction while spreading a development treatment fluid that has flowed out, detection means provided on a downstream side of the spreading roller and for detecting that a distal end portion of the instant film after the developer pod is crushed is moved, and a controller that determines a driving timing of the exposure head in response to a detection signal from the detection means and drives the exposure head in synchronization with the transport of the instant film.

In an instant camera described in JP-H07-152087A, an imaged instant film is sandwiched between a pair of conductive spread rollers from both upper and lower sides, a developer is diffused on a film surface, the instant film is transported and discharged, and static electricity generated on the film surface in a case where the instant film is supplied by anti-static brush is transferred to a plus terminal or a minus terminal of a sheet type battery and is eliminated. A photoreflector is disposed near the spread roller to detect a distal end of the instant film discharged from the spread roller.

SUMMARY OF THE INVENTION

An embodiment according to the present disclosed technology provides a printer and a digital camera including a printer capable of accurately detecting a distal end of a film and suppressing an increase in cost.

A printer according to one aspect of the present disclosed technology comprises a transport roller pair, an exposure unit, a spreading roller pair, a spreading control member, and a mechanical switch. The transport roller pair transports a film unit including a developer pod containing a developer. The exposure unit exposes an image onto a film unit transported by the transport roller pair. The spreading roller pair is disposed on a downstream side in a transport direction with respect to the transport roller pair, and spreads the developer into a gap of the film unit by crushing the developer pod of the exposed film unit.

The spreading control member is positioned between the transport roller pair and the spreading roller pair in the transport direction, extends in a width direction of the film unit, and controls the developer spread into the gap of the film unit. The mechanical switch is positioned near the spreading control member.

It is preferable that the printer comprises a first metal member that is positioned on a side opposite to the spreading control member with a transport passage of the film unit interposed therebetween and presses the film unit against the spreading control member by an elastic force.

It is preferable that the first metal member is electrically connected to a ground circuit of the mechanical switch. It is preferable that the mechanical switch includes a second metal member fixed to the ground circuit and the first metal member is electrically connected to the ground circuit by coming into contact with the second metal member.

It is preferable that a first film unit and a second film unit having a smaller dimension in the width direction than the first film unit are used as the film unit and the transport roller pair transports any one of the first film unit or the second film unit.

It is preferable that the printer comprises a roller drive mechanism that drives the transport roller pair and the spreading roller pair and the roller drive mechanism is provided at one end side in the width direction.

It is preferable that the mechanical switch is positioned 3 mm or more inside in the width direction with respect to a side end of the film unit.

It is preferable that a chamfered portion is formed at a position where a distal end in the transport direction and a side end in the width direction intersect in the film unit and the mechanical switch is positioned inside in the width direction with respect to the chamfered portion of the film unit.

It is preferable that, in a case where a dimension from a center position to a side end of the film unit in the width direction is L and a distance from the center position of the film unit to a center position of the mechanical switch in the width direction is D, the mechanical switch is disposed at a position where $0 \leq D \leq 0.3$ L.

It is preferable that the mechanical switch is turned on by being pressed by a distal end of the film unit.

A printer according to another aspect of the present disclosed technology comprises a first roller pair, a second roller pair, and a mechanical switch. The first roller pair transports a recording medium. The second roller pair is disposed on a downstream side in a transport direction with respect to the first roller pair. The mechanical switch is positioned between the first roller pair and the second roller pair in the transport direction, and is turned on by being pressed by a distal end of the recording medium.

A digital camera including a printer according to still another aspect of the present disclosed technology includes the printer, and an imaging unit that includes an imaging optical system, images a subject image, and outputs image data to the printer.

BRIEF DESCRIPTION OF THE DRAWINGS

FIG. 18 is an explanatory diagram for describing an operation of the mechanical switch.

DESCRIPTION OF THE PREFERRED EMBODIMENTS

First Embodiment

Overview of Digital Camera Including Printer

Figure 1:
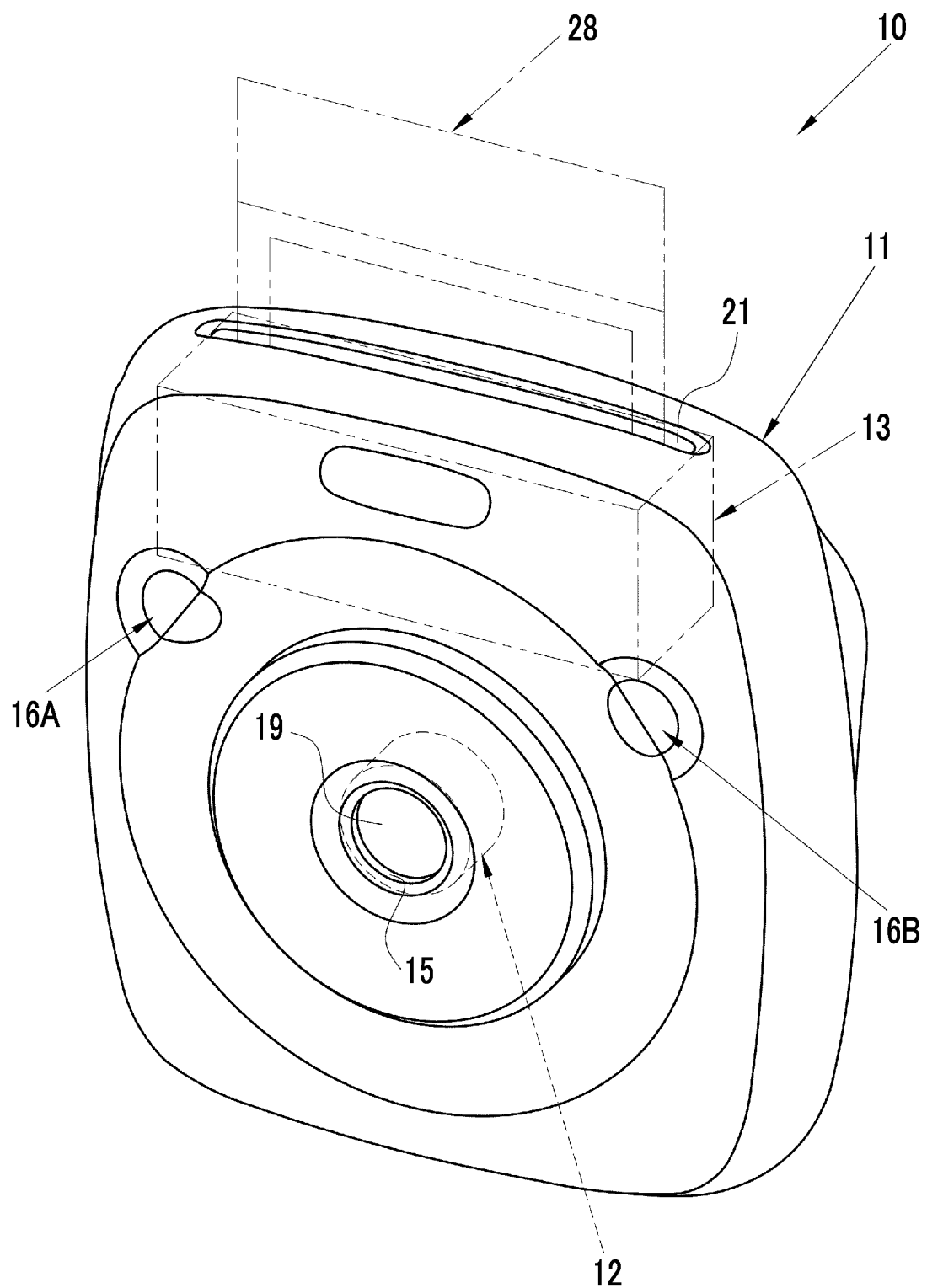
FIG. 1 is a front perspective view of a digital camera including a printer.

In FIG. 1, a digital camera 10 including a printer according to an embodiment of the present invention comprises a camera body 11, an imaging unit 12, and a printer unit 13. An imaging window 15 and two release switches 16A and 16B are provided on a front surface of the camera body 11. The imaging window 15 is disposed in a center on the front surface of the camera body 11. The imaging window 15 exposes an imaging optical system 19 (see FIG. 2) constituting the imaging unit 12.

The camera body 11 has a substantially square shape viewed from the front surface. The digital camera 10 including a printer uses instant films 28 (see FIG. 10) as a sheet-shaped recording media. The instant film 28 is, for example, a square-shaped instant film. The present invention is not limited thereto, and a wide type or card type instant film may be used. The instant film 28 corresponds to a film unit and a recording medium in the claims.

Figure 2:
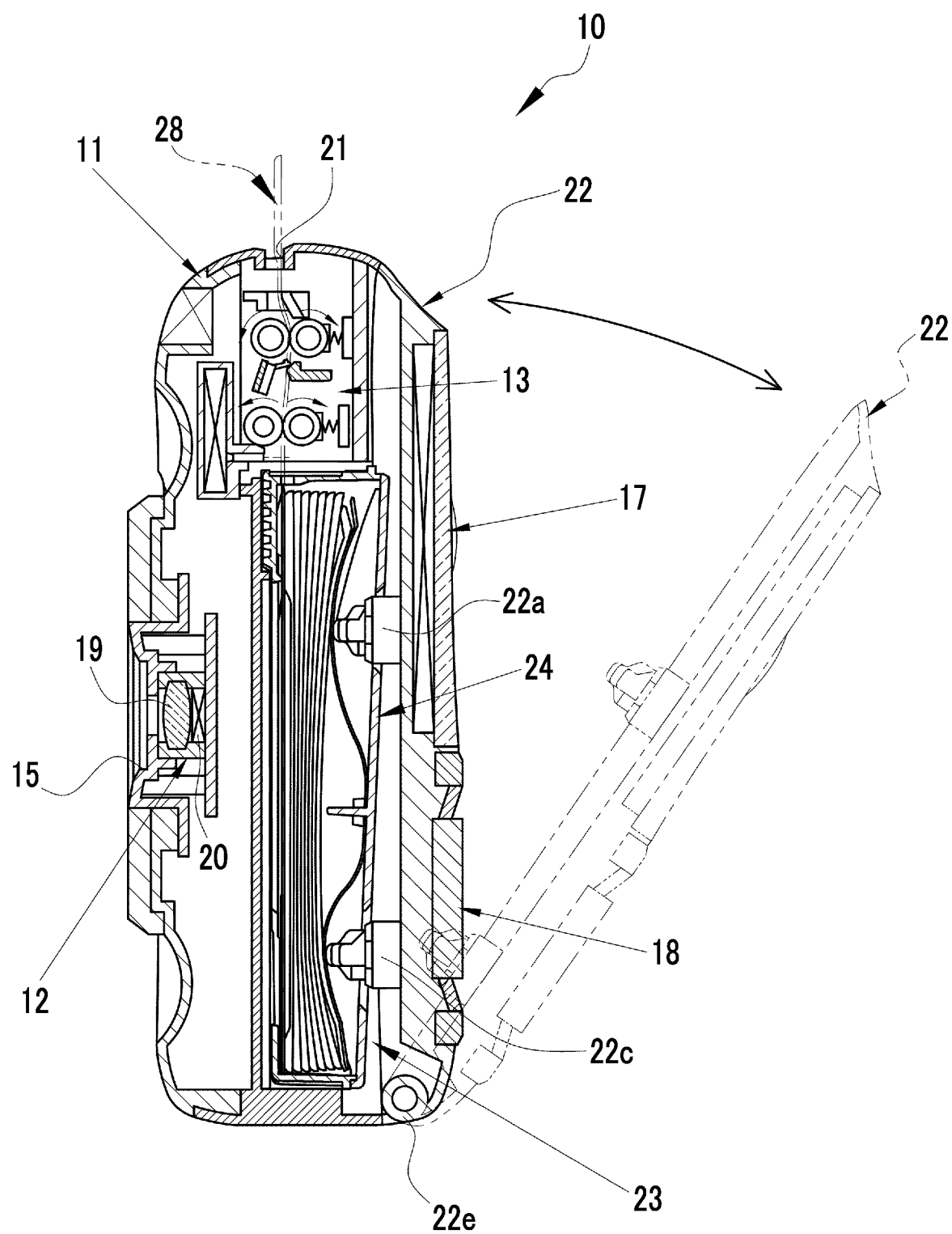
FIG. 2 is a longitudinal cross-sectional view of a center of the digital camera including a printer.

As shown in FIG. 2, the imaging optical system 19 and a solid-state imaging element 20 are provided in the imaging unit 12. For example, the solid-state imaging element 20 is a complementary metal-oxide-semiconductor (CMOS) image sensor, and includes a light-receiving surface constituted by a plurality of pixels (not shown) arrayed in a two-dimensional matrix shape. Each pixel includes a photoelectric conversion element, photoelectrically converts a subject image formed on the light-receiving surface by the imaging optical system 19, and generates an imaging signal.

The solid-state imaging element 20 comprises signal processing circuits (all not shown) such as a noise removal circuit, an auto gain controller, and an A/D conversion circuit. The noise removal circuit performs noise removal processing on the imaging signal. The auto gain controller amplifies a level of the imaging signal to an optimum value. The A/D conversion circuit converts the imaging signal into a digital signal, and outputs the digital signal to a built-in memory (not shown) from the solid-state imaging element 20. An output signal of the solid-state imaging element 20 is image data (so-called RAW data) having one color signal for each pixel.

The solid-state imaging element 20 is driven by pressing at least one of the release switch 16A or 16B, and the subject image is imaged. A film feeding port 21 is provided on a top surface of the camera body 11. The instant film 28 on which an image has been printed is discharged from the film feeding port 21.

Figure 3:
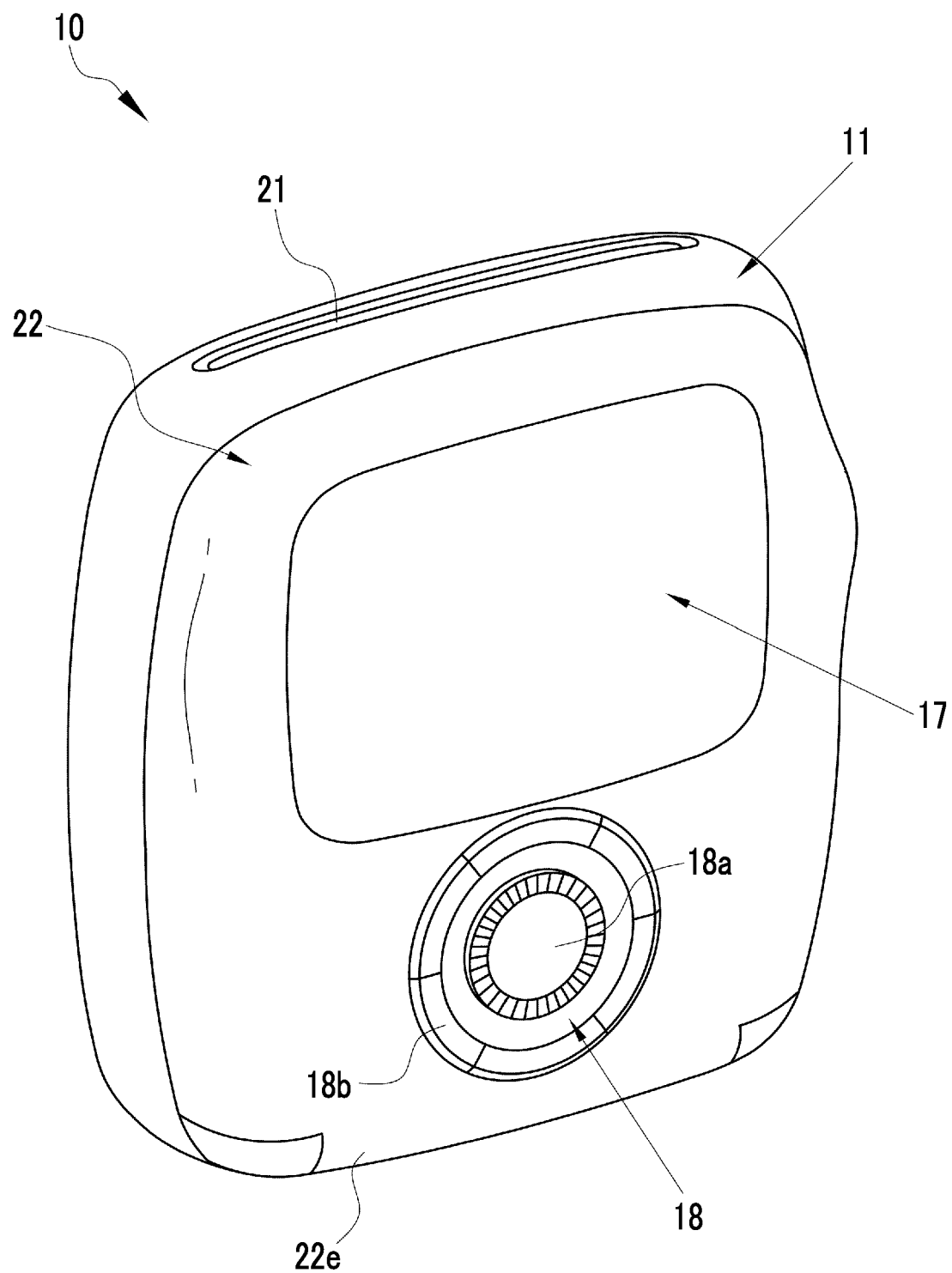
FIG. 3 is a rear perspective view of the digital camera including a printer with a loading lid in a closed position.

As shown in FIG. 3, a loading lid 22 is attached to a rear surface side of the camera body 11 through a hinge portion 22e. The hinge portion 22e rotatably supports the loading lid 22 between an opened position (state shown in FIG. 4) and a closed position (state shown in FIG. 3). A locking mechanism and an unlocking mechanism (all not shown) are provided between the camera body 11 and the loading lid 22, and in a case where the locking mechanism holds the loading lid 22 in the closed position and operates the unlocking mechanism, the loading lid 22 moves rotationally from the closed position to the opened position.

Figure 4:
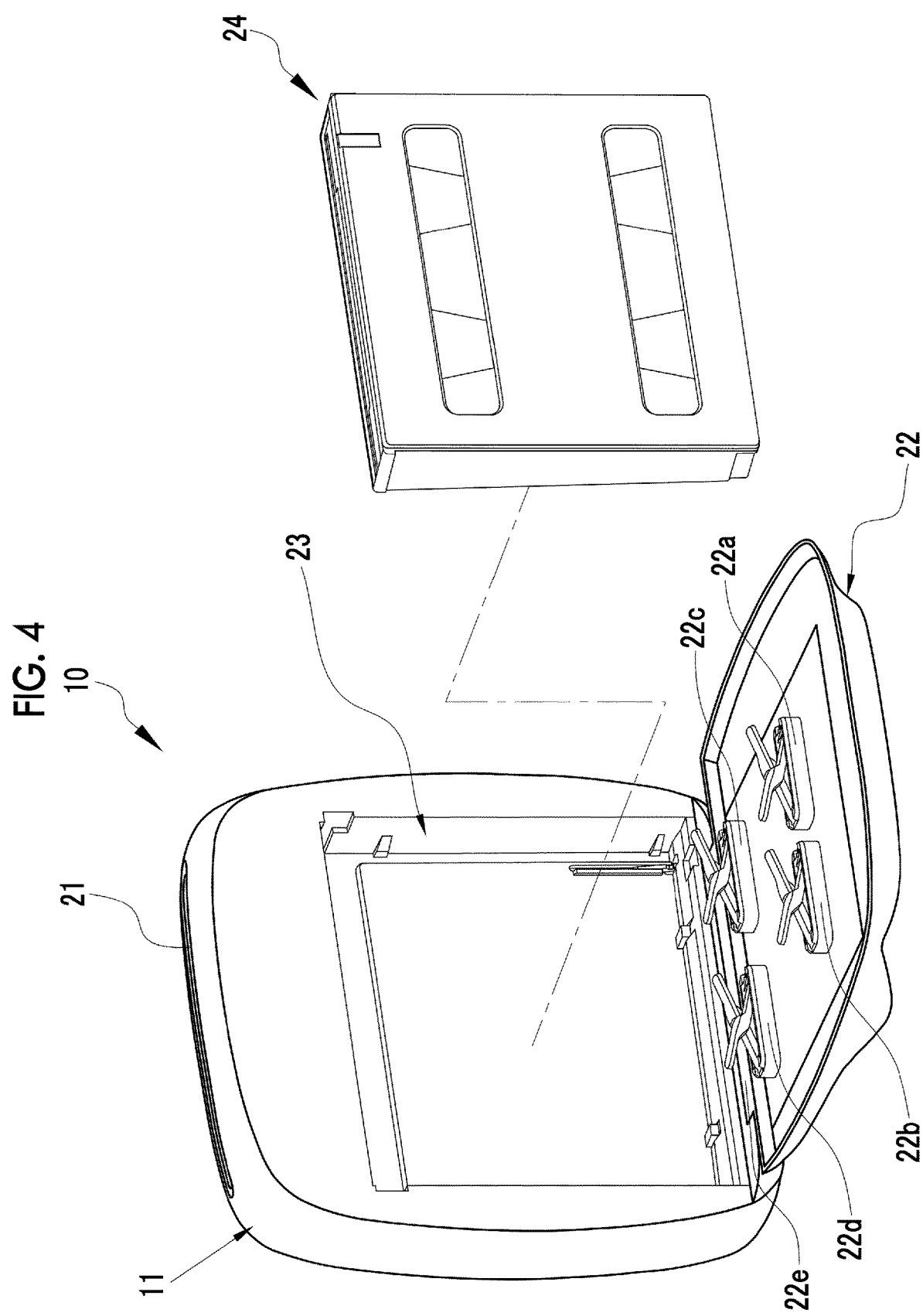
FIG. 4 is a rear perspective view of the digital camera including a printer with the loading lid in an opened position.

As shown in FIG. 4, an instant film pack 24 (recording medium pack) accommodating the instant films 28 is loaded into a loading room 23. A plurality of film holding portions 22a to 22d are provided on an inner surface of the loading lid 22.

A rear display unit 17 and an operating part 18 are provided on an outer surface of the loading lid 22, that is, a rear surface of the camera body 11. The rear display unit 17 is, for example, a liquid crystal display (LCD) panel. Image data items corresponding to one frame output from the solid-state imaging element 20 are sequentially input into the rear display unit 17, and are displayed as a live preview image.

A photographer presses at least one of the release switch 16A or 16B, and thus, imaging is started. Image data items are acquired from the solid-state imaging element 20 through the imaging. An image processing unit (not shown)

performs known image processing on the image data items, and then the image data items are compressed. Examples of the image processing include matrix operation, demosaicing, γ correction, luminance conversion, color difference conversion, and resizing. The image data items on which the image processing and the compression are performed are recorded in a built-in memory (not shown) such as a flash memory provided within the camera body 11.

In a case where a menu switch 18a of the operating part 18 is pressed, the image is played and displayed on the rear display unit 17 based on the image data items recorded in the built-in memory. In a case where an image desired to be printed is displayed on the rear display unit 17, the photographer presses a print switch 18b of the operating part 18, and thus, printing processing by the printer unit 13 is started.

Configuration of Instant Film Pack

Figure 5:
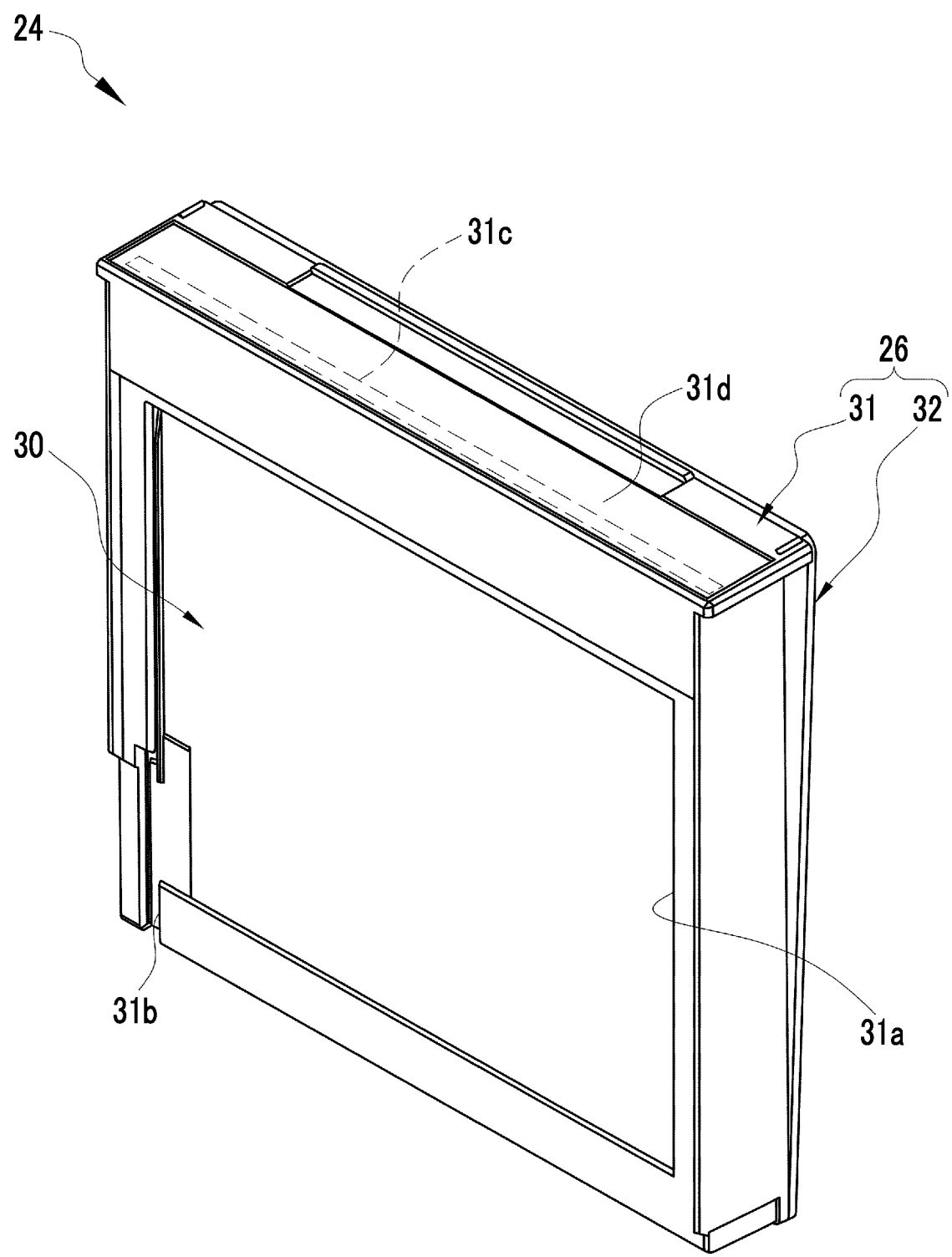
FIG. 5 is a perspective view of an instant film pack.
Figure 6:
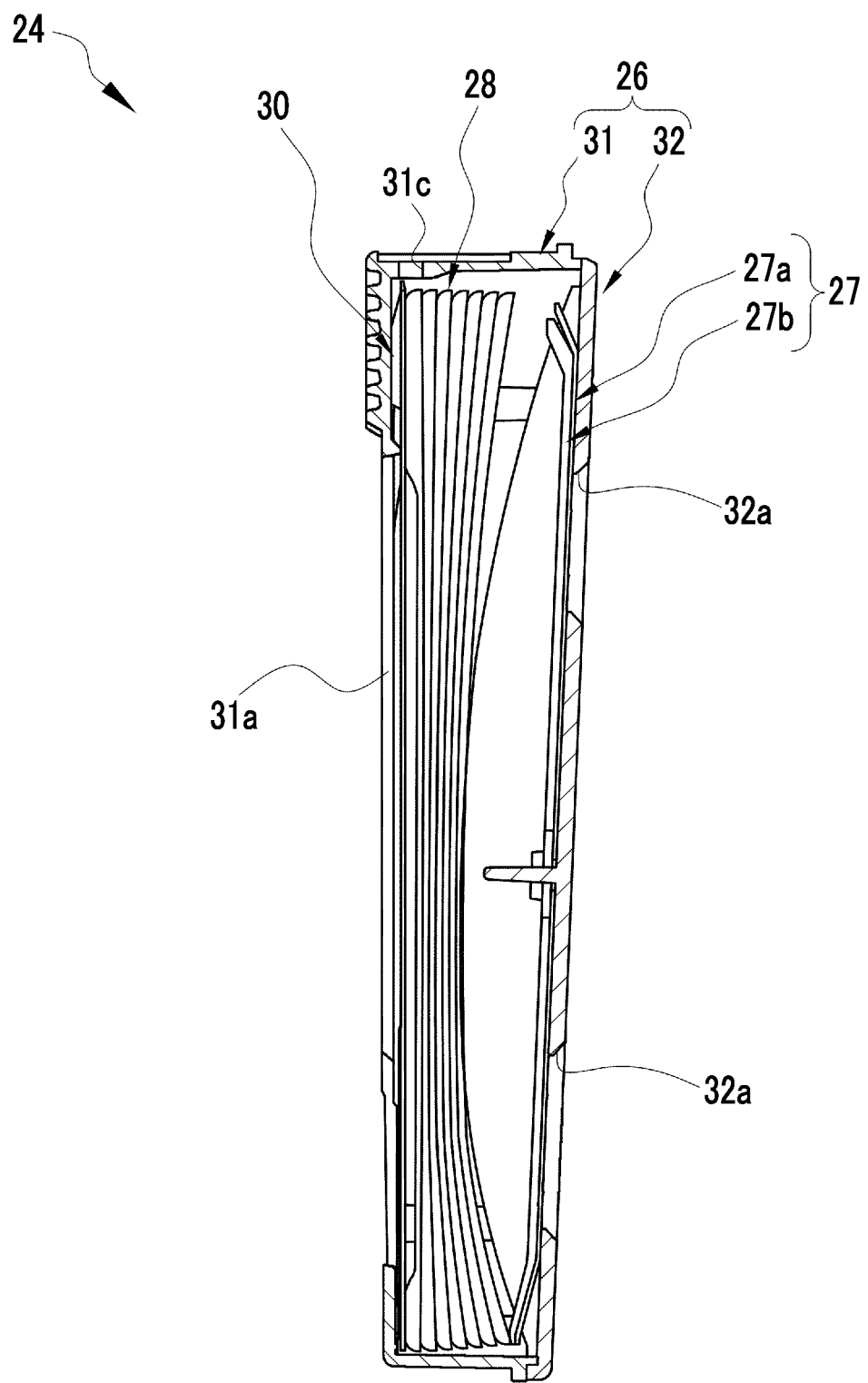
FIG. 6 is a cross-sectional view of the instant film pack.

As shown in FIGS. 5 and 6, the instant film pack 24 comprises a case 26, a film press plate 27, a plurality of instant films 28, and a film cover 30.

As shown in FIG. 6, the case 26 accommodates the plurality of instant films 28 and one film cover 30 in a stacking manner. The case 26 is made of a material such as a thermoplastic resin or a paper resin acquired by mixing the thermoplastic resin with cellulose. The case 26 includes a box-shaped case member 31, and a lid 32 that covers an opening formed in a rear surface side of the case member 31.

Figure 7:
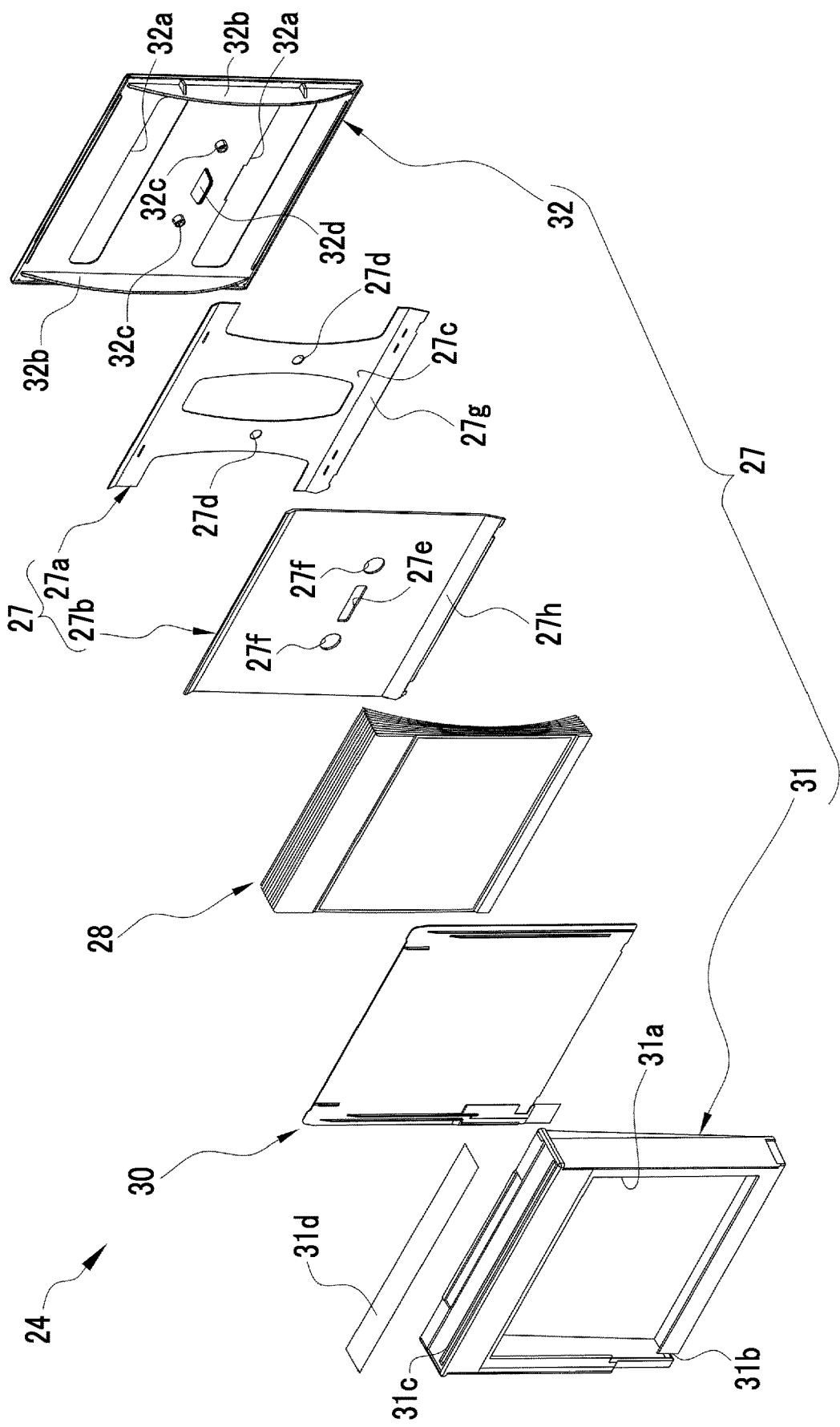
FIG. 7 is an exploded perspective view of the instant film pack.

As shown in FIG. 7, an exposure aperture 31a for exposing the instant film 28 is formed in the case member 31. In the following description, a surface of the instant film pack 24 in which the exposure aperture 31a is formed is a "front surface", a surface opposite to the "front surface" is a "rear surface", a surface facing the film feeding port 21 of the camera body 11 is a "top surface", and a surface opposite to the "top surface" is a "bottom surface". The film cover 30 is overlapped before the instant film 28 positioned in a foremost layer initially set in the exposure aperture 31a within the case member 31. Accordingly, the exposure aperture 31a is lighttightly blocked by the film cover 30. A cut-off portion 31b into which a known claw member 59 (see FIGS. 11, 12, and 13) formed at the camera is inserted is formed in a lower portion of the exposure aperture 31a. The cut-off portion 31b is a cut-off portion in a straight line through which the claw member 59 passes in a case where the instant film 28 or the film cover 30 is fed. The cut-off portion 31b is connected from the lower portion of the exposure aperture 31a to a bottom surface of the case member 31.

A feeding port 31c is formed on a top surface of the case member 31. The feeding port 31c is formed in a slit shape. The instant films 28 or the film cover 30 are fed one by one outwards from the instant film pack 24 by the claw member 59 inserted into the cut-off portion 31b of the case member 31 through the feeding port 31c.

A light shielding seal 31d is pasted onto the case member 31 so as to close the feeding port 31c from an outside. The light shielding seal 31d is formed as a flexible sheet. The light shielding seal 31d is pasted onto only one edge of a long side of the feeding port 31c so as not to hinder the instant film 28 or the film cover 30 when the instant film or the film cover passes through the feeding port 31c.

As shown in FIG. 7, the lid 32 includes a pair of openings 32a, a pair of unit support protrusions 32b, a pair of caulking pins 32c, and a support piece 32d. The pair of openings 32a are formed so as to be vertically spaced apart from each other by a predetermined interval, and serve as an entrance into which the film holding portions 22a to 22d provided in the digital camera 10 including a printer are inserted when the digital camera 10 including a printer is loaded.

The pair of unit support protrusions 32b are provided at both side edge portions of the lid 32 so as to be vertically long, and each has an arc shape of which a center portion protrudes toward the exposure aperture 31a. The unit support protrusions 32b come into contact with both side edge portions on a rear surface of the instant film 28 positioned in a last layer, and push up the instant film 28 by each having the arc shape of which the center portion protrudes toward the exposure aperture 31a. Accordingly, a gap between the film cover 30 and the exposure aperture 31a is prevented from being formed.

The pair of caulking pins 32c are used for attaching the film press plate 27. The support piece 32d supports a center portion of the instant film 28 positioned in the last layer from behind, and prevents the instant film 28 from being curved in a direction in which the center portion is curved toward the lid 32.

The film press plate 27 includes two elastic sheets 27a and 27b made of a synthetic resin. The sheet 27a is pressed by the plurality of film holding portions 22a to 22d when the loading lid 22 is closed, and is curved so as to protrude toward the lid 32. An opening 27c and a pair of holes 27d are formed in the sheet 27a. The opening 27c is formed in a center portion of the sheet 27a so as to be vertically long, and the support piece 32d is inserted into this opening. The pair of caulking pins 32c are inserted into the pair of holes 27d, and the pair of holes are used for attaching the film press plate 27 to the lid 32.

An opening 27e and a pair of holes 27f are formed in the sheet 27b. The opening 27e is formed in the center portion of the sheet 27a, and the support piece 32d is inserted into this opening. The pair of caulking pins 32c are inserted into the pair of holes 27f. A lower end portion 27h of the sheet 27b is attached to a lower end portion 27g of the sheet 27a. Accordingly, the sheet 27b prevents the sheet 27a from being slack, and prevents light leak from the pair of openings 32a. The sheet 27b pushes up the instant film 28 in a substantially planar manner when the sheet 27a is elastically bent by the plurality of film holding portions 22a to 22d. As a result, the film cover 30 positioned in the foremost layer or the instant film 28 is pressed to the back side of the front surface of the case member 31.

Configuration of Instant Film

Figure 8:
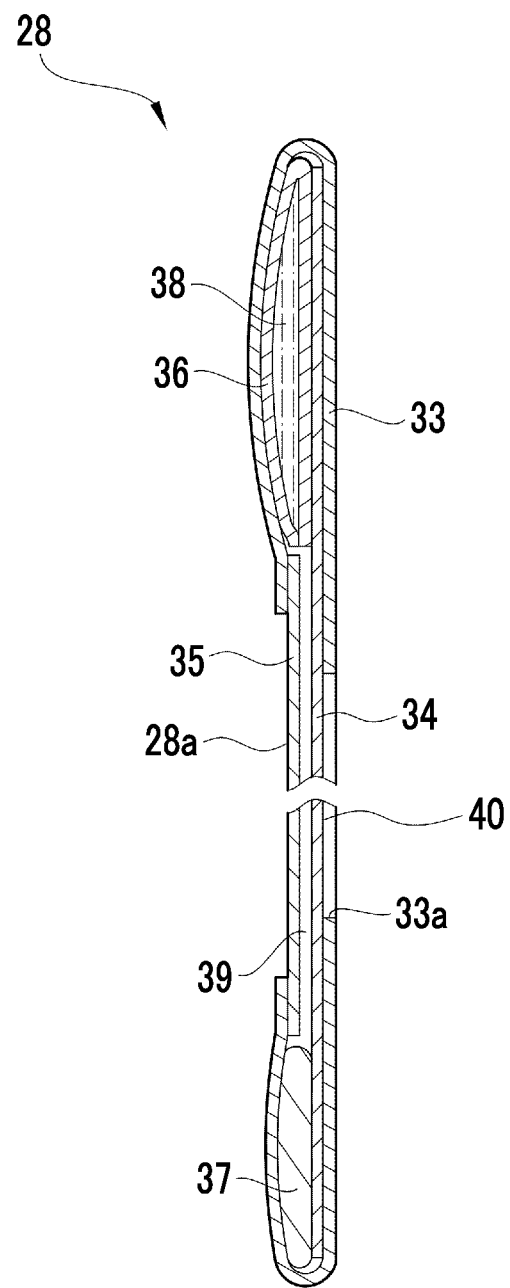
FIG. 8 is a cross-sectional view of the instant film.

As shown in FIG. 8, the instant film 28 includes a mask sheet 33, a photosensitive sheet 34, a cover sheet 35, a developer pod 36, and a trap portion 37, and is a so-called mono-sheet type film. The mask sheet 33 is formed in a sheet shape made of a thin synthetic resin, and comprises a screen opening 33a. A photosensitive layer, a diffusion reflective layer, an image receiving layer, and the like are provided in the photosensitive sheet 34. The cover sheet 35 includes an exposure surface 28a facing an exposure unit 50 to be described below.

The developer pod 36 is formed in a substantially bag shape, and contains a developer 38 therein. The developer pod 36 is pasted onto an end portion of the photosensitive sheet 34 close to the feeding port 31c, and is wrapped by an end portion of the mask sheet 33. The trap portion 37 is pasted onto an end portion of the photosensitive sheet 34 opposite to the feeding port 31c, and is similarly wrapped by the end portion of the mask sheet 33.

The photosensitive layer of the instant film 28 is irradiated with print light at the time of printing, and thus, the photosensitive layer is exposed. The developer pod 36 is torn at the time of development, and the developer 38 flows and is spread into a gap 39 between the photosensitive sheet 34 and the cover sheet 35. An image acquired through the exposure of the photosensitive layer is reversed by the diffusion reflective layer, and is transferred to the image receiving layer. By doing this, a positive image appears on an image observation surface 40 of the photosensitive sheet 34 exposed through the screen opening 33a.

The film cover 30 is formed in a thin sheet shape and has light shielding properties and flexibility. In a case where the instant film pack 24 is loaded into the loading room 23 and is used, the film cover 30 is discharged to the film feeding port 21 by a spreading roller pair 54 (see FIGS. 9 and 10) to be described later.

Configuration of Printer Unit

Figure 9:
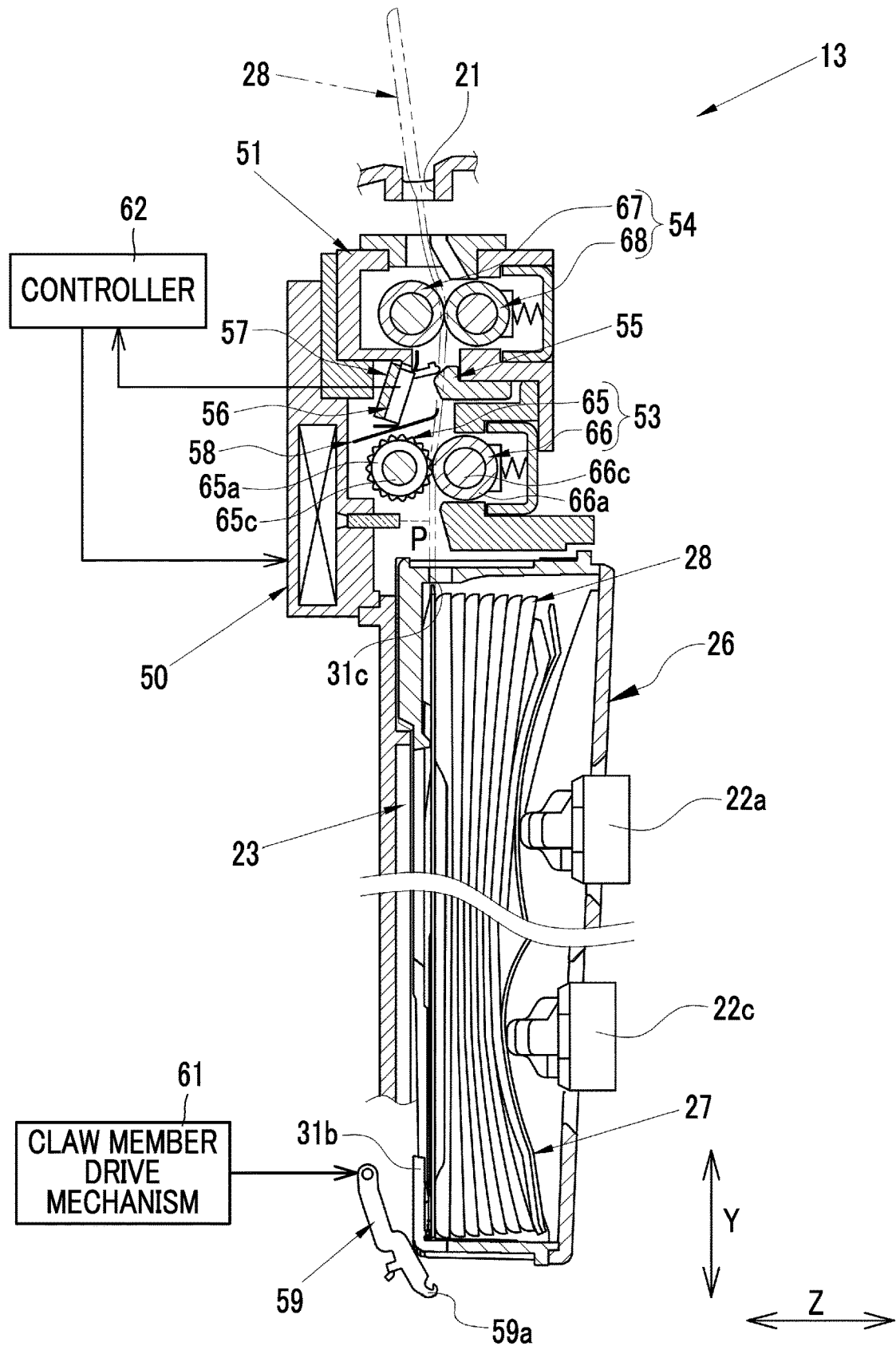
FIG. 9 is a cross-sectional view of a printer unit.
Figure 10:
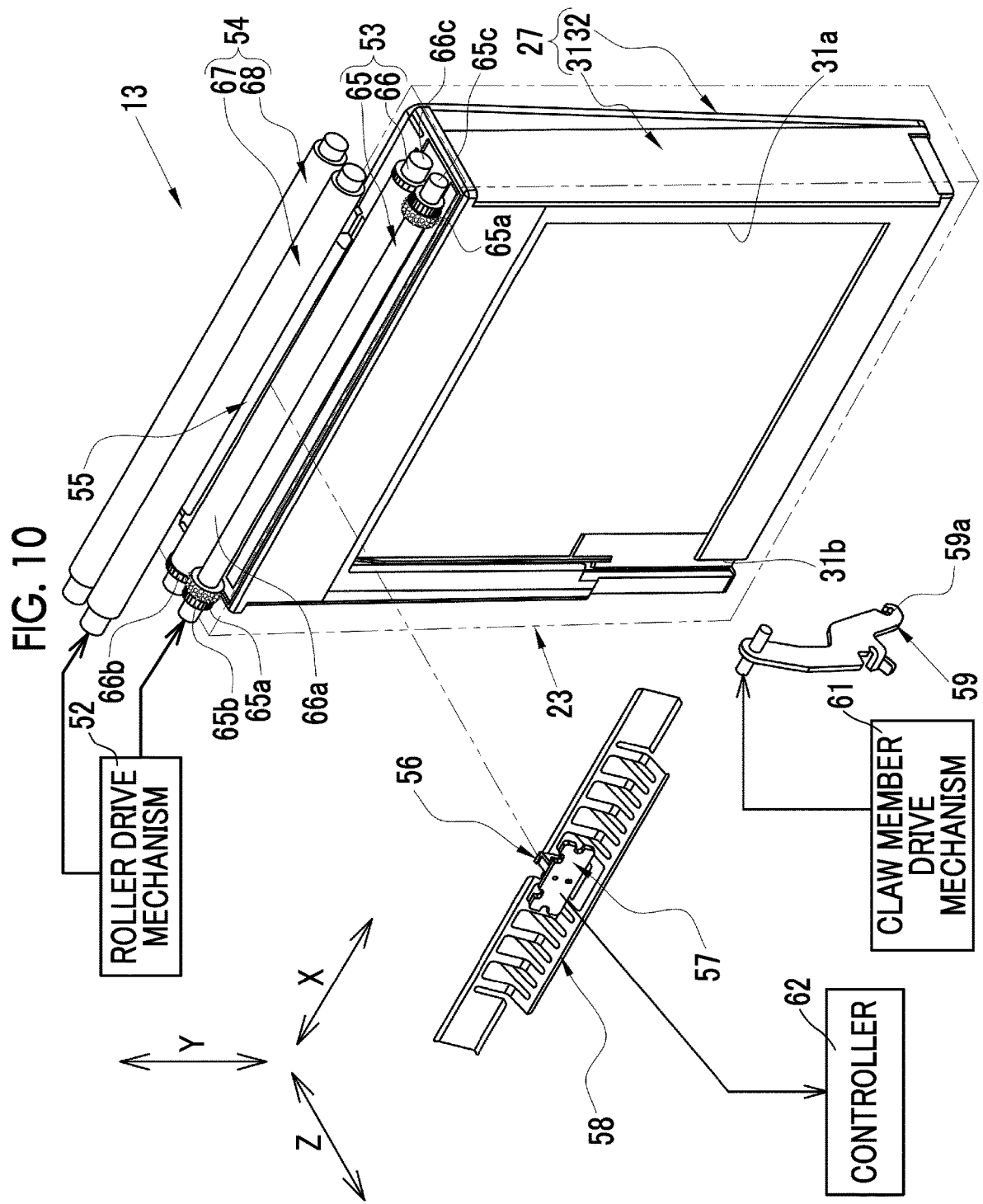
FIG. 10 is a perspective view of the printer unit in which a device housing is omitted.

As shown in FIGS. 9 and 10, the printer unit 13 includes the exposure unit 50, a device housing 51 (see FIG. 11), a roller drive mechanism 52, a transport roller pair 53, the spreading roller pair 54, a spreading control member 55, a mechanical switch 56, a circuit board 57, a first metal member 58, the claw member 59, a claw member drive mechanism 61, and a controller 62. The transport roller pair 53 corresponds to a first roller pair in the claims, and the spreading roller pair 54 corresponds to a second roller pair in the claims.

In FIG. 10, although the device housing 51 and the like are not shown in order to avoid complication, in reality, the printer unit 13 is constituted by attaching the exposure unit 50, the roller drive mechanism 52, the transport roller pair 53, the spreading roller pair 54, the spreading control member 55, the first metal member 58, the claw member 59, the claw member drive mechanism 61, and the like to the device housing 51.

Hereinafter, a transport direction in which the transport roller pair 53 transports the instant film 28 is a Y direction, a width direction of the instant film 28 orthogonal to the Y direction is an X direction, and a direction orthogonal to the X direction and the Y direction is a Z direction.

Figure 11:
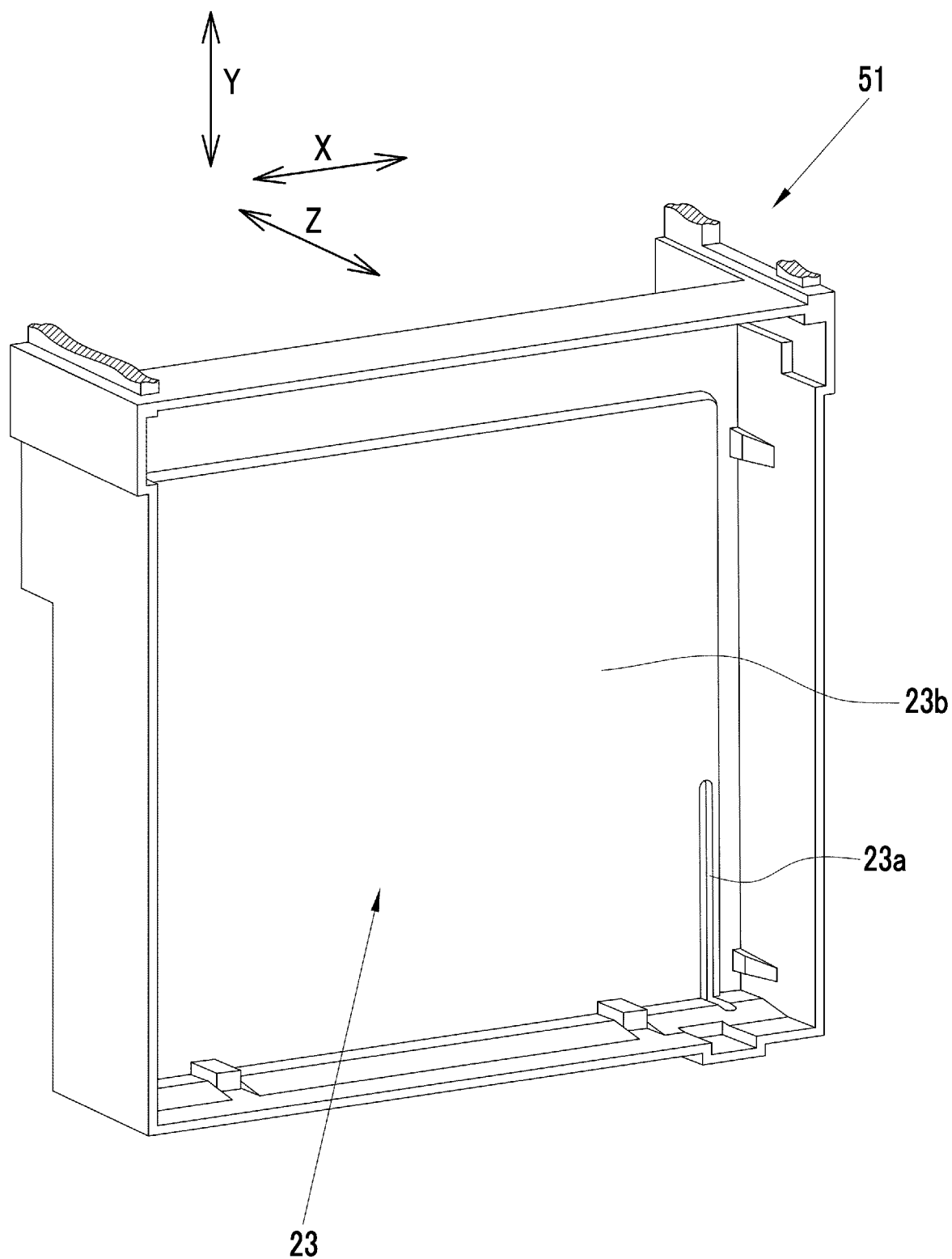
FIG. 11 is a perspective view of the device housing.

As shown in FIG. 11, the device housing 51 is formed in a box shape in which the rear surface side of the camera body 11 is opened, and the loading room 23 is integrally provided. In addition to the loading room 23, the device housing 51 has a frame portion that supports the exposure unit 50, the roller drive mechanism 52, the transport roller pair 53, the spreading roller pair 54, the spreading control member 55, the mechanical switch 56, the circuit board 57, the first metal member 58, the claw member 59, and the like, but these components are omitted in FIG. 11. The device housing 51 is made of, for example, a resin material.

As described above, the instant film pack 24 is loaded into the loading room 23. An image is recorded on the instant film 28 discharged from the instant film pack 24 by the printer unit 13.

Configuration of Transport Roller Pair and Spreading Roller Pair

The transport roller pair 53 and the spreading roller pair 54 are pivotally supported by a bearing unit (not shown) provided in the device housing 51. The transport roller pair 53 and the spreading roller pair 54 are driven to be rotated by the roller drive mechanism 52, and transport the film cover 30 and the instant film 28. The roller drive mechanism 52 comprises, for example, a motor as a drive source and a drive transmission gear train that transmits a rotational driving force.

The transport roller pair 53 includes a capstan roller 65 and a pinch roller 66. The capstan roller 65 and the pinch roller 66 are disposed at positions at which these rollers pinch a transport passage of the instant film 28 (see FIGS. 9 and 14). The capstan roller 65 includes a pair of columnar spike roller members 65a, a drive gear 65b, and a rotational shaft 65c that holds each spike roller member 65a and the drive gear 65b.

The pinch roller 66 includes a roller member 66a, a drive gear 66b, and a rotational shaft 66c. The drive gears 65b and 66b are provided at both end portions of the rotational shafts 65c and 66c and mesh with each other. A motor is connected to one end of the rotational shaft 65c via a drive transmission gear train. Thus, in a case where the motor rotates, the capstan roller 65 and the pinch roller 66 rotate in synchronization with each other. The instant film 28 discharged from the instant film pack 24 is transported toward the spreading roller pair 54 by the transport roller pair 53.

The spreading roller pair 54 includes spreading rollers 67 and 68, and is disposed on a downstream side of the transport roller pair 53 in the transport direction. The spreading roller 67 is disposed on a side of the instant film 28 facing the exposure surface 28a. The spreading roller 68 is disposed on a side of the instant film 28 facing the image observation surface 40. A motor is connected to one end of the spreading roller 67 or 68 via a drive transmission gear train. Thus, in a case where the motor rotates, the spreading rollers 67 and 68 are rotated in synchronization with the motor.

The spreading roller pair 54 transports the instant film 28 transported by the transport roller pair 53 toward the film feeding port 21 while pinching the instant film over the entire width. The instant film is pinched by the spreading roller pair 54, and thus, the developer pod 36 of the instant film 28 is crushed. Accordingly, the developer is spread (unfolded) into the gap 39 (see FIG. 8).

The transport roller pair 53 transports the instant film 28 fed from the instant film pack 24 by the claw member 59 toward the film feeding port 21. An exposure position P (see FIGS. 9 and 14) at which the exposure unit 50 exposes the instant film 28 to the print light is positioned between the feeding ports 31c of the instant film pack 24 and the transport roller pair 53. The exposure using the exposure unit 50 is performed for a period during which the instant film is transported by the transport roller pair 53.

The controller 62 controls the exposure of the exposure unit 50 based on the image data. The exposure by the exposure unit 50 is performed by sequentially exposing line images on the instant film 28 while moving the instant film 28 for each line. Accordingly, an image corresponding to a single screen is exposed on the photosensitive layer of the instant film 28. The instant film 28 is subsequently transported toward the spreading roller pair 54 by the transport roller pair 53.

Configuration of Film Holding Portion

In a case where the loading lid 22 is in the opened position, the loading room 23 is opened (the state shown in FIG. 4), and in a case where the loading lid 22 is in the closed position, the loading lid 22 covers the opened rear surface of the loading room 23 (the state shown in FIG. 3). The instant film pack 24 is positioned in the X direction and the Y direction with respect to the loading room 23, and is further positioned in the Z direction by positioning the loading lid 22 in the closed position. Specifically, the plurality of film holding portions 22a to 22d provided at the loading lid 22 are positioned in the Z direction with respect to the instant film pack 24.

In a case where the instant film pack 24 is loaded into the loading room 23 and the loading lid 22 is positioned in the closed position, the plurality of film holding portions 22a to 22d are inserted into the instant film pack 24 through the opening 32a, and press the film press plate 27 (see FIG. 9).

Accordingly, the instant films 28 in the instant film pack 24 are pressed in a stacking direction.

Configuration of Loading Room

As shown in FIG. 11, the loading room 23 has a slit 23a. A front surface 23b of the loading room 23 faces the instant film 28 accommodated in the instant film pack 24 in a case where the instant film pack 24 is loaded into the loading room 23. The slit 23a is formed by cutting out a part of the front surface 23b. The claw member 59 described above enters the inside of the case 26 through the slit 23a, and the instant films 28 are fed outwards from the instant film pack 24 one by one.

The claw member 59 has a hook whose distal end portion 59a is bent in a C shape (see FIG. 9), and the distal end portion 59a engages with and presses against the base end portion of the instant film 28. The claw member 59 is driven straight and rotationally by the claw member drive mechanism 61. The claw member drive mechanism 61 has a known configuration including a motor and a drive transmission gear train.

Configuration of Spreading Control Member

As shown in FIG. 9, the spreading control member 55 (see also FIGS. 13 and 14) is provided at a position between the transport roller pair 53 and the spreading roller pair 54 in the Y direction. The spreading control member 55 is formed in a plate shape extending in the X direction, and is fixed to the device housing 51, for example, by screwing. The spreading control member 55 comes into contact with the image observation surface 40 of the instant film 28 that has been transported, and controls the distribution of the developer being spread into the gap 39 by rubbing the image observation surface 40 of the instant film 28.

Configuration of Mechanical Switch

Figure 12:
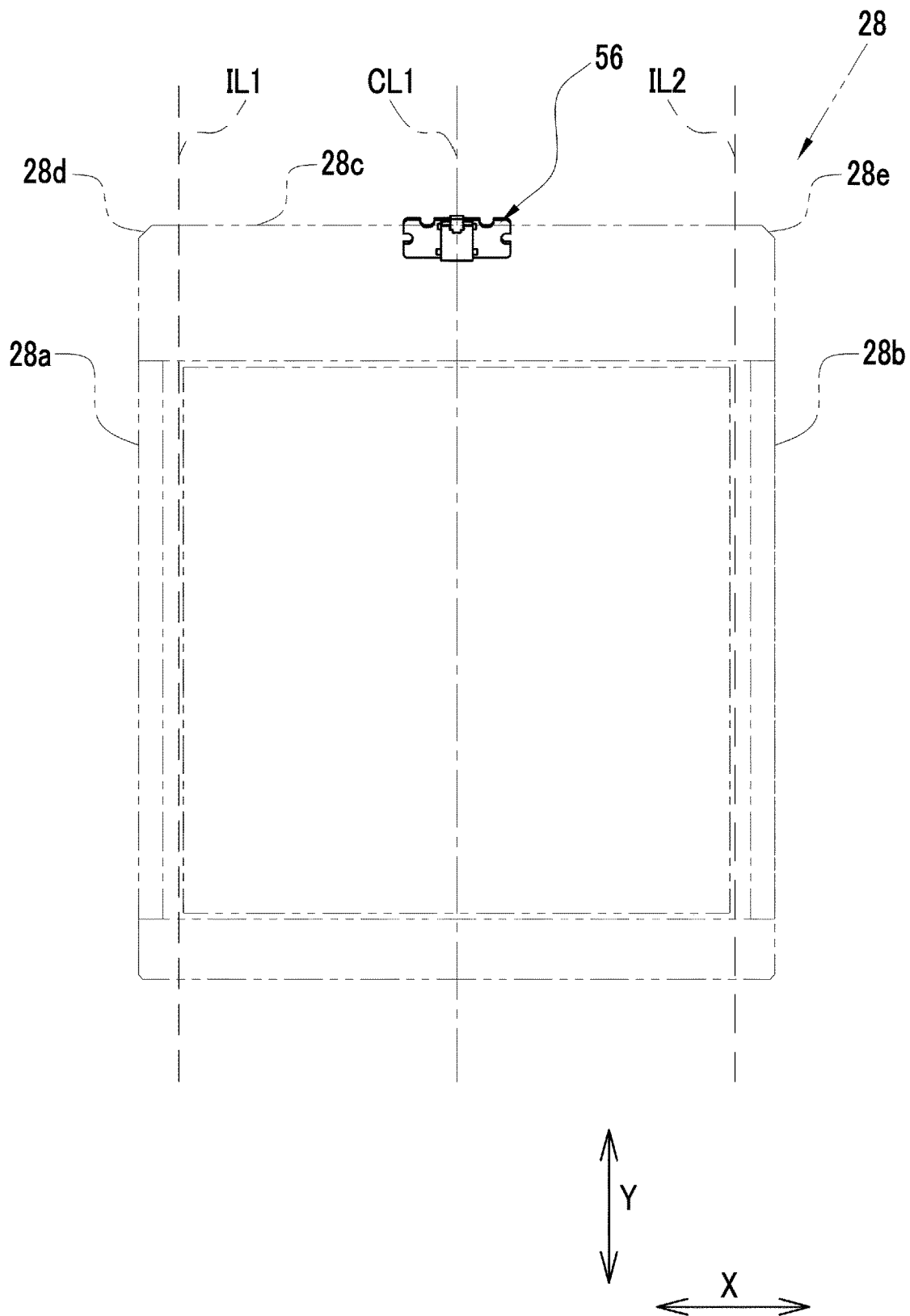
FIG. 12 is an explanatory diagram showing a positional relationship between a mechanical switch and an instant film being transported.

The mechanical switch 56 is positioned near the spreading control member 55. FIG. 12 shows a positional relationship between the mechanical switch 56 and the instant film 28 being transported by the transport roller pair 53. The mechanical switch 56 is disposed so as to correspond to a position of a center CL1 of the instant film 28 in the X direction. It is preferable that the mechanical switch 56 is positioned 3 mm or more inside in the X direction with respect to side ends 28a and 28b of the instant film 28. The term "inside" as used herein means that the instant film 28 is positioned close to the center CL1 of the instant film 28 with respect to the side ends 28a and 28b of the instant film 28 in the X direction.

Broken lines IL1 and IL2 are straight lines indicating the positions inside the side ends 28a and 28b by 3 mm in the X direction. That is, it is preferable that the mechanical switch 56 is positioned inside the broken lines IL1 and IL2. As described above, since the instant film 28 includes the developer pod 36 containing the developer 38, the instant film is formed by bending a sheet as a material. For this reason, in the instant film 28, chamfered portions 28d and 28e are formed at positions where a distal end 28c and the side ends 28a and 28b in the Y direction intersect. The chamfered portions 28d and 28e are formed at positions within 1 mm with respect to the side ends 28a and 28b of the instant film 28. That is, the mechanical switch 56 is positioned inside the chamfered portions 28d and 28e.

Configuration of First Metal Member

Figure 13:
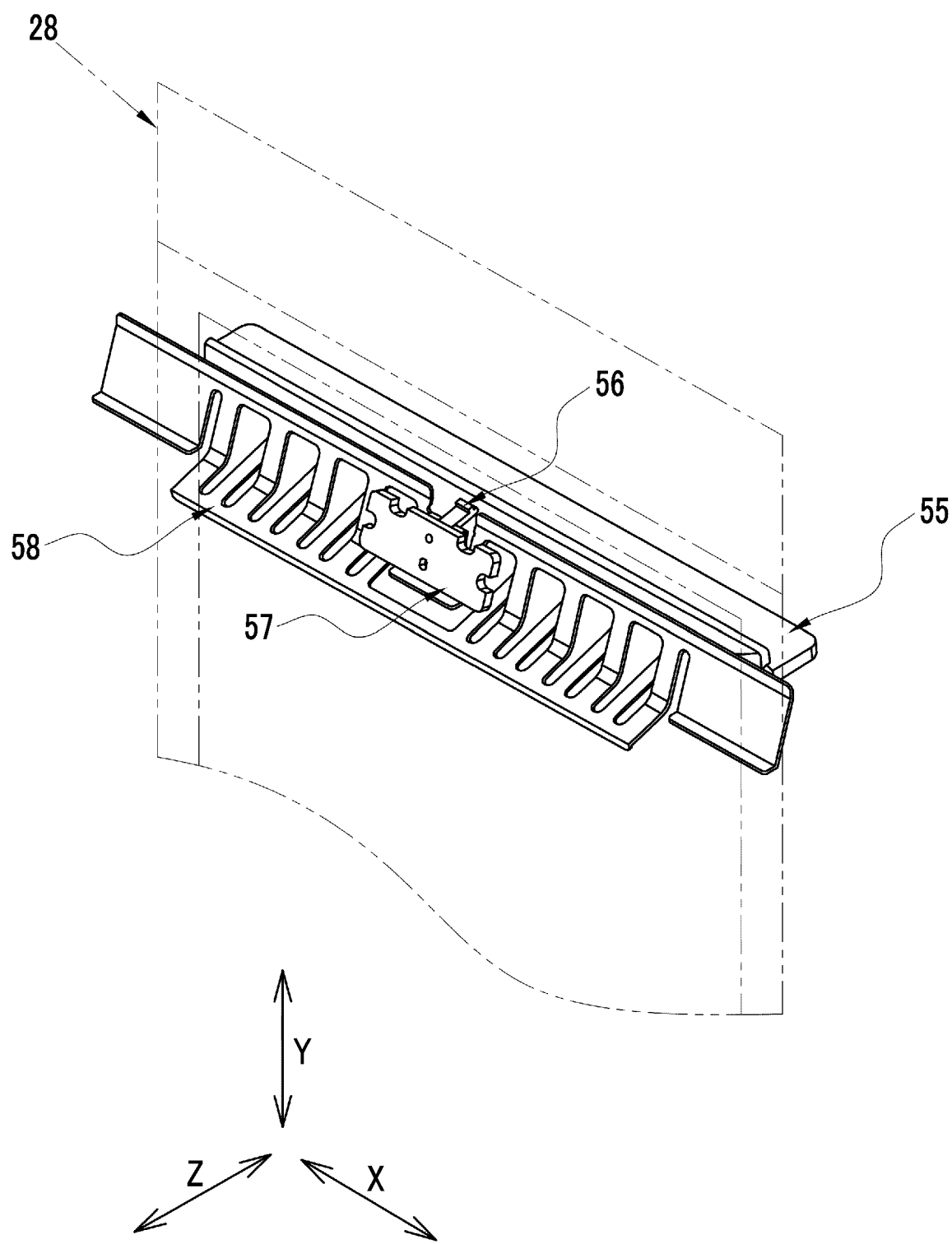
FIG. 13 is a perspective view showing a positional relationship between a spreading control member, a first metal member, a mechanical switch, and an instant film being transported.
Figure 14:
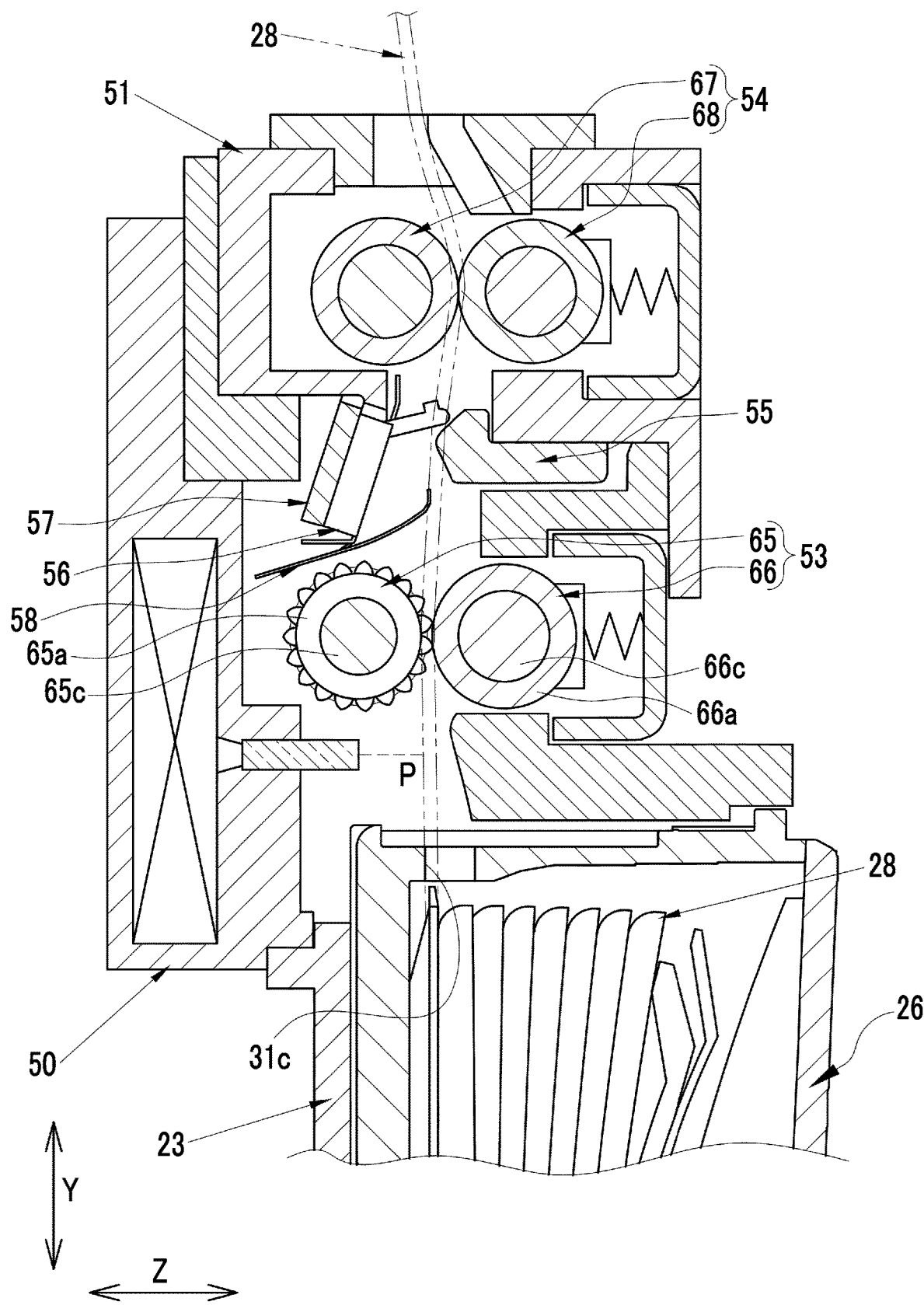
FIG. 14 is a cross-sectional view of a main part of a digital camera including a printer cut at an edge part of the spreading control member, the first metal member, and the mechanical switch.

As shown in FIGS. 13 and 14, the first metal member 58 is positioned on a side opposite to the spreading control member 55 with the transport passage of the instant film 28 interposed therebetween. The first metal member 58 is formed by bending a plate-shaped member made of a conductive metal.

Figure 15:
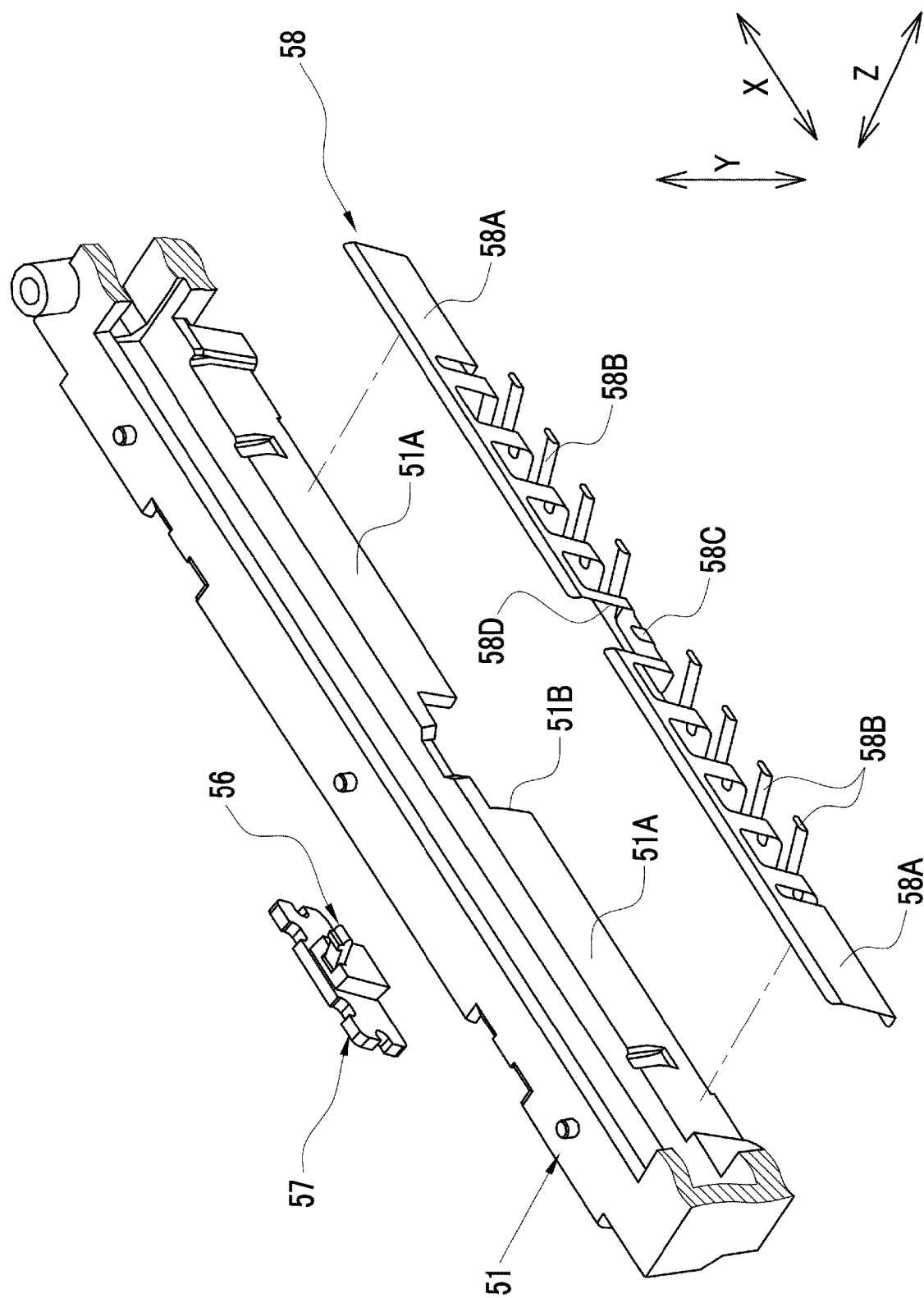
FIG. 15 is a perspective view of the first metal member, the mechanical switch, and a part of the device housing as viewed from a rear surface side.

As shown in FIG. 15, the first metal member 58 is formed in an L shape in side view, that is, as viewed from the X direction. Specifically, the first metal member 58 includes fixed pieces 58A, a plurality of contact pieces 58B formed by being bent with respect to the fixed pieces 58A, and a protrusion piece 58C. The device housing 51 includes planar attachment surfaces 51A at positions aligned with the fixed pieces 58A. FIG. 15 shows only a part of the device housing 51 that fixes the first metal member 58. In the first metal member 58, the fixed pieces 58A are fixed to the attachment surfaces 51A of the device housing 51. As a method for fixing the fixed pieces 58A to the device housing 51, for example, the fixed pieces adhere to the device housing by an adhesive tape and/or an adhesive.

In the first metal member 58, the plurality of contact pieces 58B come into contact with the instant film 28. The plurality of contact pieces 58B are disposed in a comb-teeth shape at regular intervals. In a case where the contact pieces 58B come into contact with the instant film 28, the contact pieces 58B are bent in a direction opposite to the spreading control member 55. The contact pieces 58B bent by the contact with the instant film 28 generate a force that tends to return to an original position, that is, an elastic force. By this elastic force, the contact pieces 58B press the instant film 28 against the spreading control member 55.

Configuration of Second Metal Member and Circuit Board

The device housing 51 includes a recess 51B that is recessed with respect to the attachment surfaces 51A. The circuit board 57 is fixed to the recess 51B of the device housing 51. As a method for fixing the circuit board 57 to the device housing 51, for example, the circuit board adheres to the device housing by engagement of an engagement pin and an engagement hole and/or bonded with an adhesive.

Figure 16:
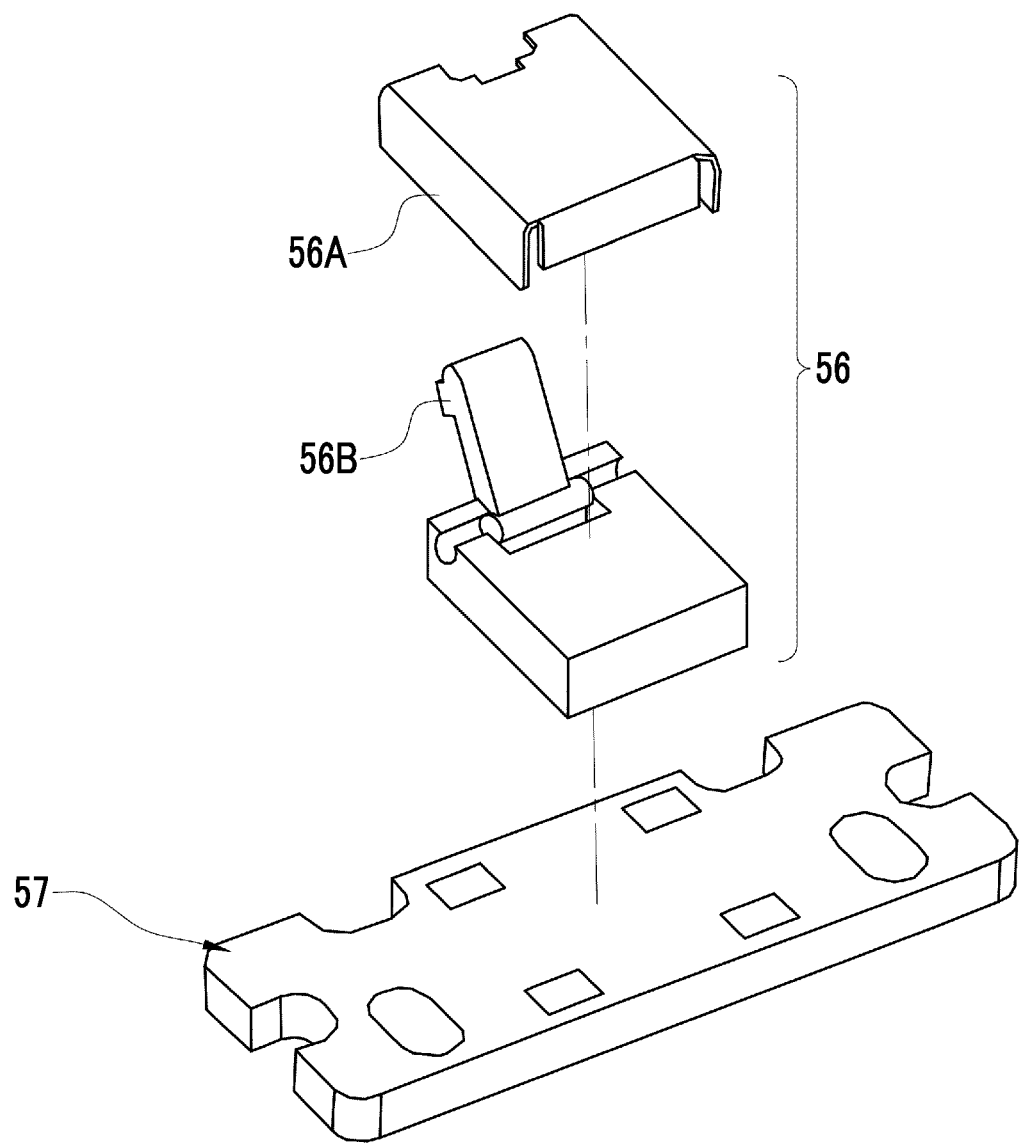
FIG. 16 is a perspective view showing a configuration of the mechanical switch and a circuit board.

As shown in FIG. 16, the mechanical switch 56 includes an exterior member 56A, a pressed portion 56B, and a spring member (not shown). The exterior member 56A is made of a conductive metal and is formed in a box shape. The pressed portion 56B and the spring member are held inside the exterior member 56A. The exterior member 56A corresponds to a second metal member in the claims. A part of the pressed portion 56B protrudes from the exterior member 56A and is pressed by the instant film 28 being transported as will be described later.

A ground circuit of the mechanical switch 56 is formed on the circuit board 57. In the mechanical switch 56, for example, the exterior member 56A is fixed to the circuit board 57 by bonding or soldering. Accordingly, the exterior member 56A is electrically connected to the ground circuit of the mechanical switch 56. The mechanical switch 56 is fixed to the device housing 51 via the circuit board 57. The mechanical switch 56 is disposed at a position where the mechanical switch passes through the recess of the device housing 51 described above, and faces the first metal member 58.

As described above, the first metal member 58 and the mechanical switch 56 are attached to the device housing 51, and the protrusion piece 58C of the first metal member 58 comes into contact with the exterior member 56A of the mechanical switch 56.

Figure 17:
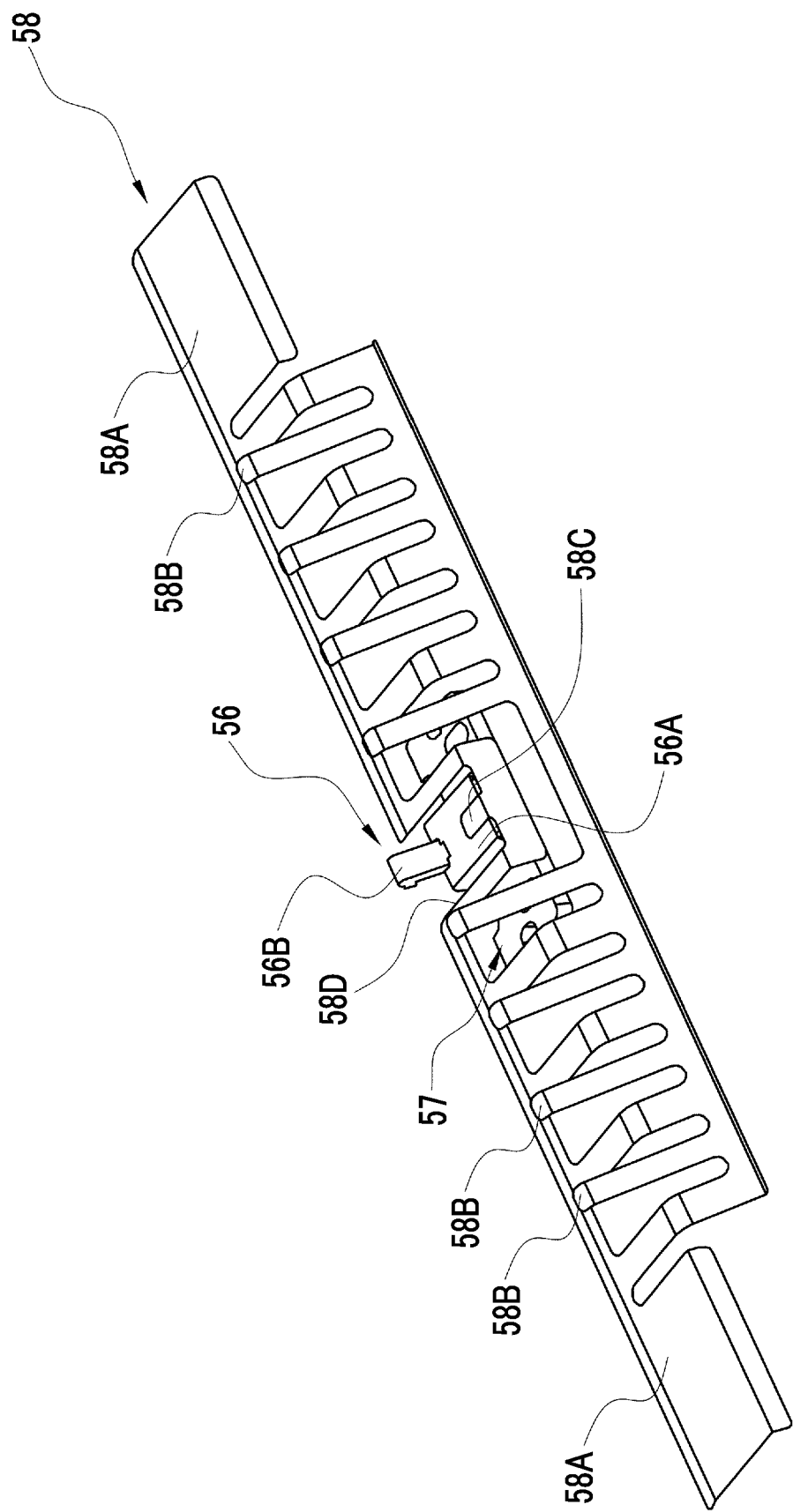
FIG. 17 is a perspective view showing a connection state between the mechanical switch and the first metal member.

As shown in FIG. 17, the protrusion piece 58C is positioned inside a hole portion 58D obtained by cutting out a part of the fixed pieces 58A, and is disposed in parallel with the fixed pieces 58A. The hole portion 58D is formed at a position aligned with the exterior member 56A of the mechanical switch 56. The protrusion piece 58C is pressed against the exterior member 56A by curving the fixed pieces 58A positioned on both sides of the protrusion piece 58C.

Accordingly, the first metal member 58 is electrically connected to the ground circuit of the mechanical switch 56 via the exterior member 56A. The present invention is not limited thereto, and the first metal member 58 may be electrically directly connected to the ground circuit of the mechanical switch 56.

As shown in (A) of FIG. 18, in a case where the mechanical switch 56 is not pressed by the instant film 28, the pressed portion 56B protrudes toward the spreading control member 55 due to biasing of a spring member (not shown). On the other hand, as shown in (B) of FIG. 18, in a case where the instant film 28 is being transported by the transport roller pair 53, the pressed portion 56B is pressed from the distal end of the instant film 28. The pressed portion 56B which is pressed from the distal end of the instant film 28, rotates against the biasing of the spring member, and internal contacts come into contact. That is, the mechanical switch 56 is turned on by being pressed from the distal end of the instant film 28. The turned-on mechanical switch 56 outputs a signal to the controller 62. The controller 62 which receives the signal from the mechanical switch 56 counts a predetermined number, and then drives the exposure unit 50 to start the exposure of the image to the instant film 28.

Action of Printer Unit

As described above, the mechanical switch 56 is positioned near the spreading control member 55. Accordingly, in a case where the printer unit 13 of the digital camera 10 including a printer is operated, the mechanical switch 56 is turned on by being pressed from the distal end of the instant film 28, and the distal end of the instant film 28 can be accurately detected. The controller 62 that receives the signal from the mechanical switch 56 counts the predetermined number. In a case where the controller 62 counts the predetermined number, the distal end of the exposure surface 28a of the instant film 28 reaches the exposure position P. The controller 62 drives the exposure unit 50 to start the exposure of the image to the exposure surface 28a. Accordingly, the exposure unit 50 can accurately expose an image so as to correspond to a position of the exposure surface 28a. Since the distal end of the instant film 28 can be detected by inexpensive detection means called the mechanical switch 56, an increase in cost of the entire device can be suppressed.

The mechanical switch 56 is positioned 3 mm or more inside in the X direction with respect to the side ends 28a and 28b of the instant film 28. Accordingly, since the mechanical switch 56 is positioned inside the chamfered portions 28d and 28e, the chamfered portions 28d and 28e do not pass through the position of the mechanical switch 56 in a case where the distal end of the instant film 28 is detected. Accordingly, the mechanical switch 56 can more accurately detect the distal end of the instant film 28.

The printer unit comprises the first metal member 58 at the position opposite to the spreading control member 55 with the transport passage of the instant film 28 interposed therebetween, and the instant film 28 is pressed against the spreading control member 55 by the elastic force of the first metal member 58. Accordingly, the spreading control member 55 can securely rub the image observation surface 40 of the instant film 28, and can accurately control the distribution of the developer. Thus, the image quality of the image formed on the instant film 28 is improved.

In a case where the first metal member 58 is not grounded to the ground circuit, since the first metal member 58 is made of metal, the first metal member 58 is charged with static electricity by the contact with the instant film 28. In a case where the first metal member 58 is charged with static electricity, there is a possibility of adverse effects such as attracting dust to the first metal member 58 and the instant film 28. On the other hand, in the present embodiment, the first metal member 58 is grounded to the ground circuit of the mechanical switch 56. Accordingly, the first metal member 58 can be prevented from being charged with static electricity, and an adverse effect due to static electricity can be avoided.

Figure 19:
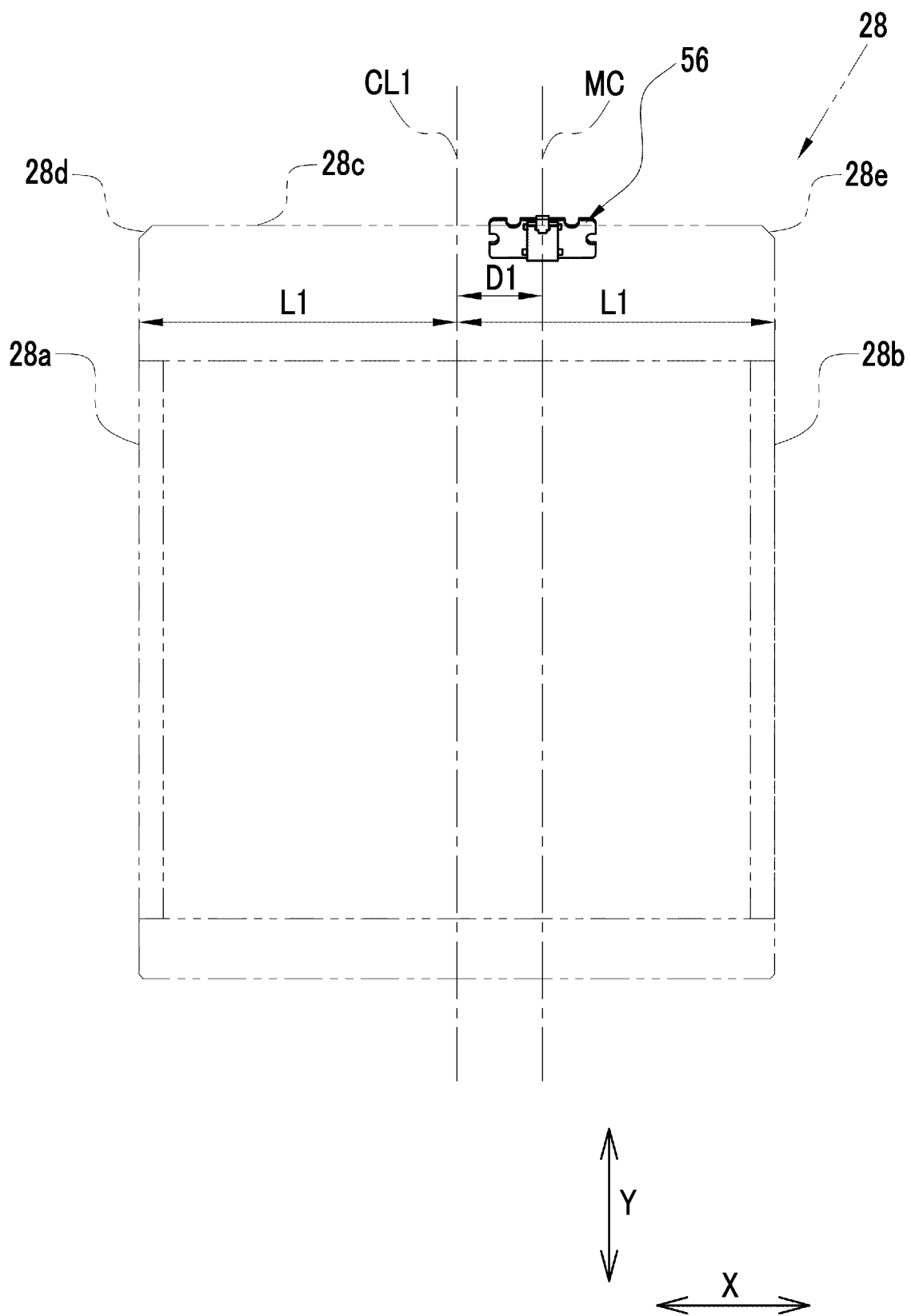
FIG. 19 is an explanatory diagram showing a positional relationship between a mechanical switch and an instant film being transported in a modified example of the first embodiment.

In the first embodiment, the mechanical switch 56 is disposed so as to correspond to the position of the center CL1 of the instant film 28 in the X direction or is disposed at the position 3 mm or more inside with respect to the side ends 28a and 28b, and the present invention is not limited thereto. As shown in FIG. 19, in a case where a dimension from the position of the center CL1 of the instant film 28 in the X direction to the side ends 28a and 28b is L1 and a distance to a position of a center MC of the mechanical switch 56 from the position of the center CL1 of the instant film 28 in the X direction is D1, it is preferable that the mechanical switch 56 is disposed at a position where $0 \leq D1 \leq 0.3\ L1$.

Second Embodiment

In the first embodiment, the present invention is applied to the printer unit 13 and the digital camera 10 including a printer that use only the instant film 28 of one type of size, but the present invention is not limited thereto. The present invention may be applied to a printer unit and a digital camera including a printer that use two types of instant films having different dimensions in the width direction.

Figure 20:
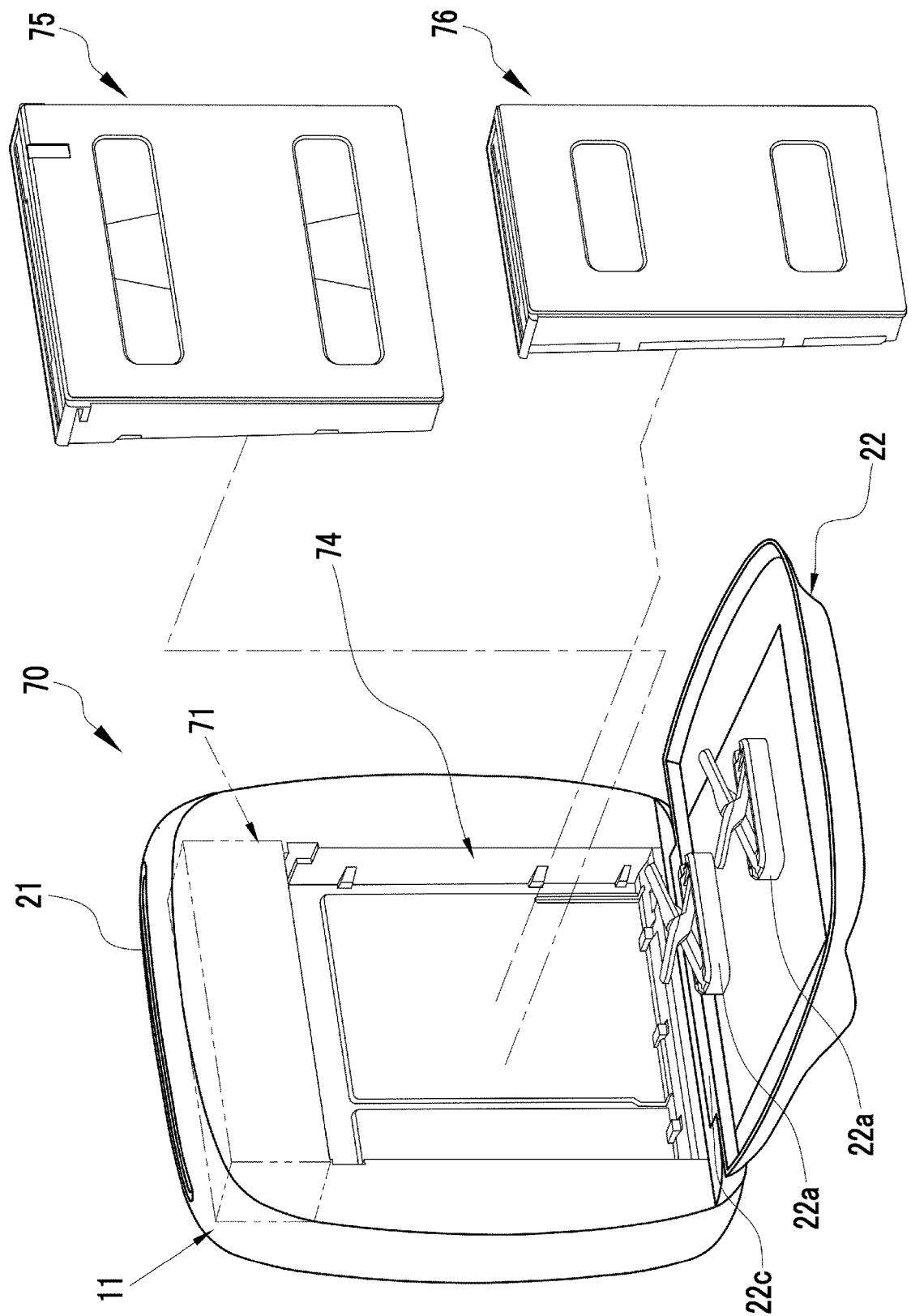
FIG. 20 is a rear perspective view of a digital camera including a printer in a state where a loading lid in a second embodiment is in an opened position.
Figure 22:
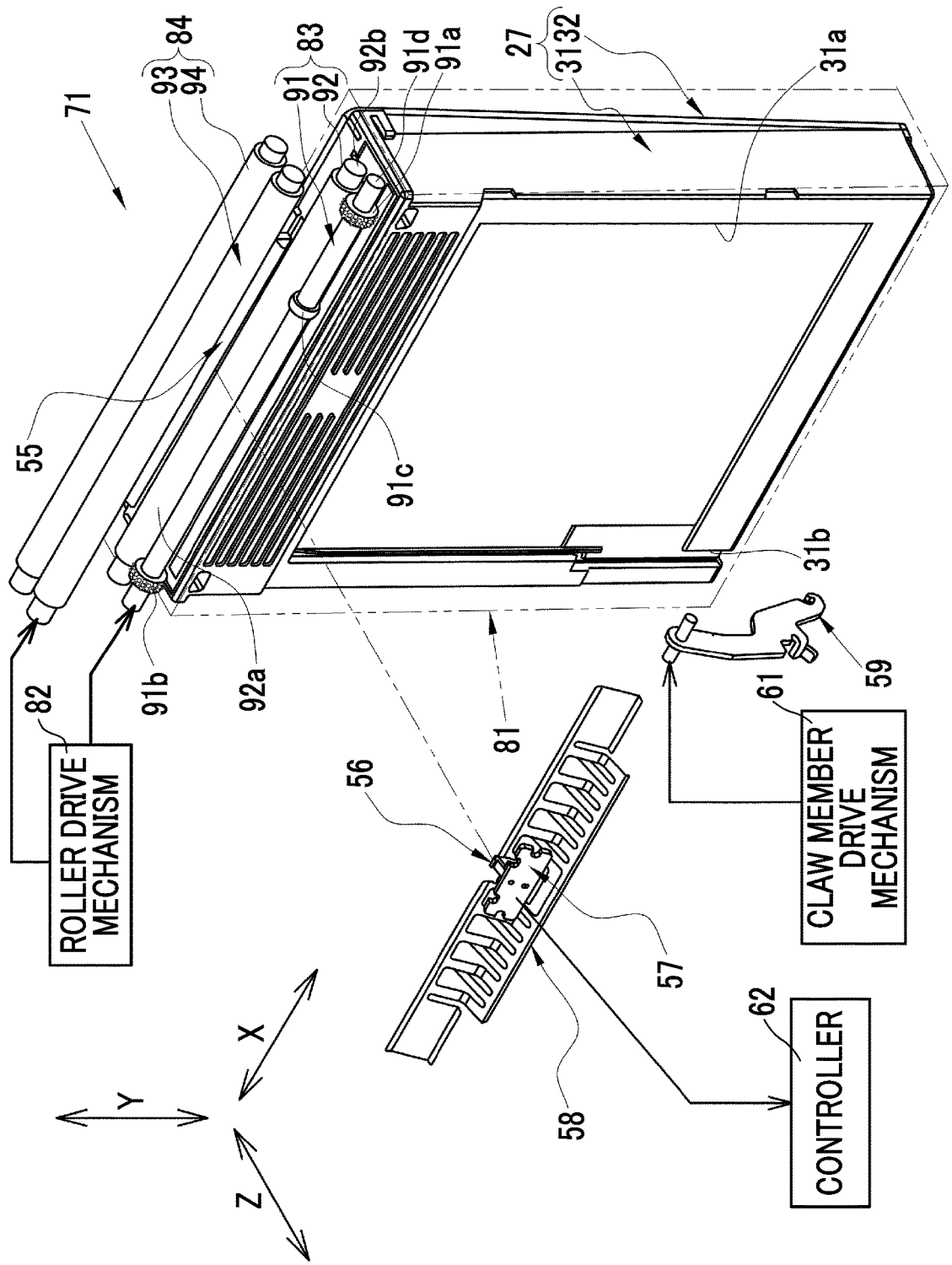
FIG. 22 is a perspective view of the printer unit in the second embodiment.

As shown in FIG. 20, a digital camera 70 including a printer according to the present embodiment comprises a camera body 11, an imaging unit (not shown), and a printer unit 71 (see FIG. 22). The same parts and members as those of the digital camera 10 including a printer of the first embodiment are designated by the same reference numerals, and the description thereof will be omitted. The imaging unit comprised in the digital camera 70 including a printer is the same as the imaging unit 12 comprised in the digital camera 10 including a printer in the first embodiment.

Figure 24:
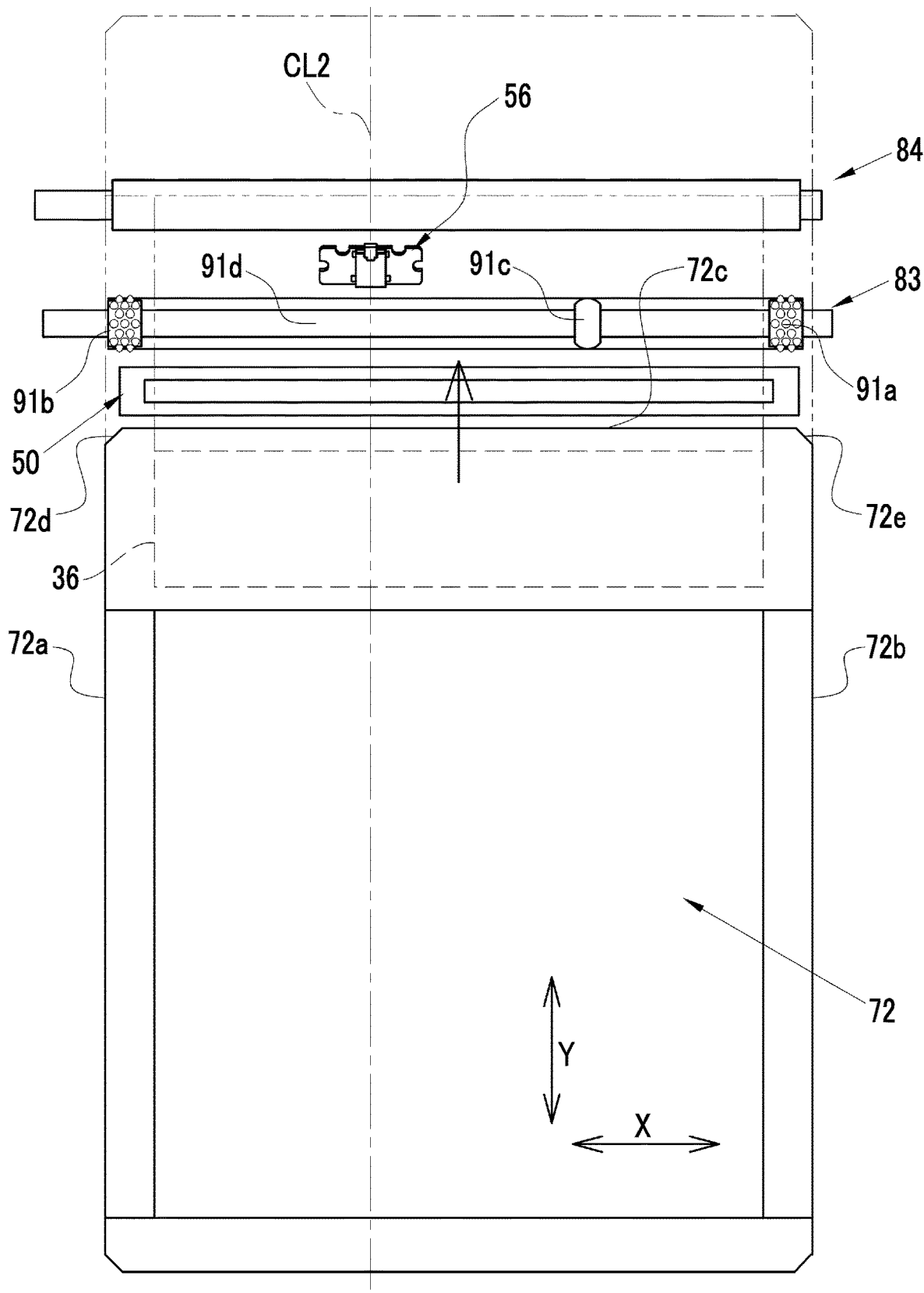
FIG. 24 is an explanatory diagram showing a positional relationship between a transport roller pair, a spreading roller pair, a mechanical switch, and a first instant film being transported in the second embodiment.
Figure 25:
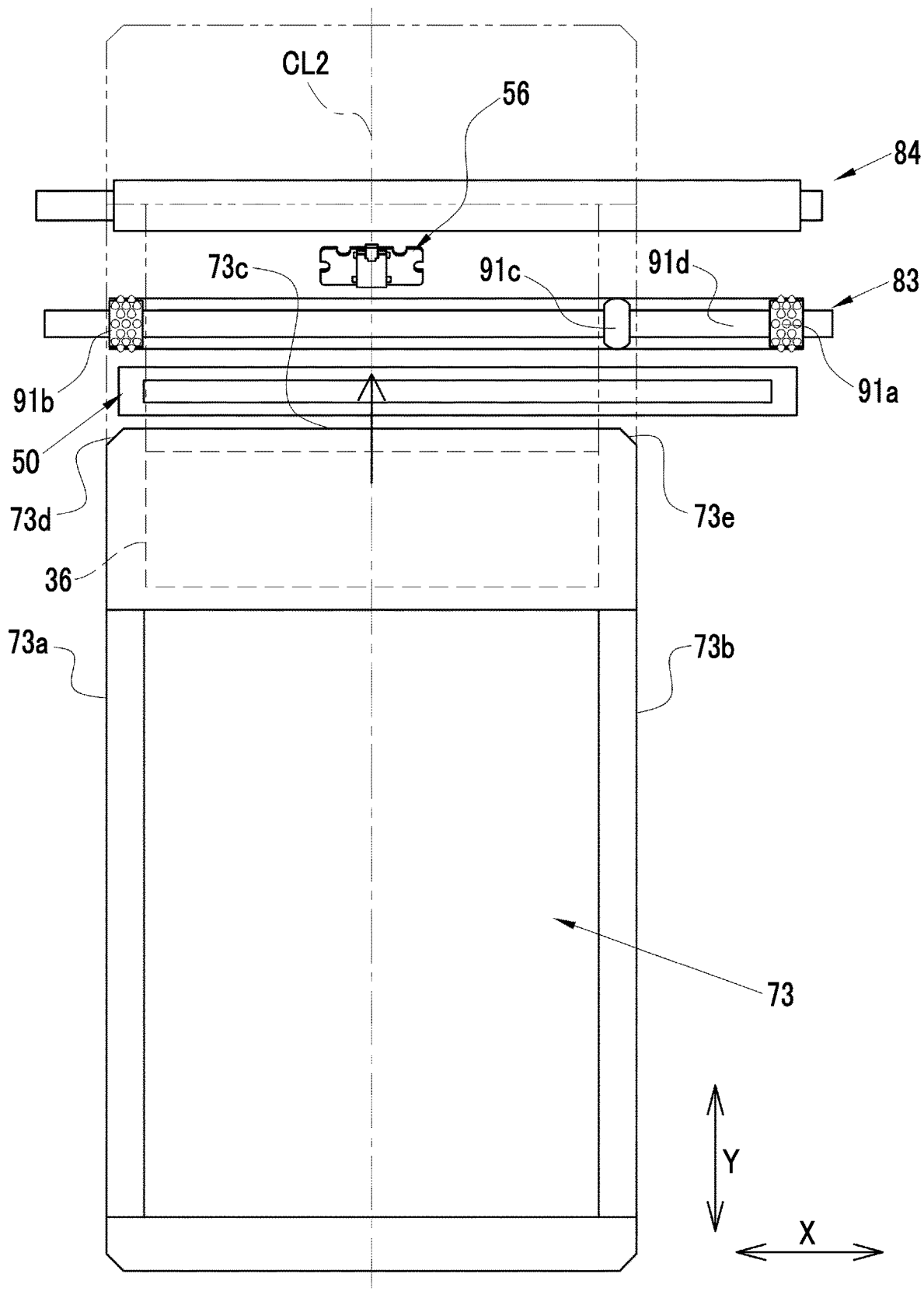
FIG. 25 is an explanatory diagram showing a positional relationship between the transport roller pair, the spreading roller pair, the mechanical switch, and a second instant film being transported in the second embodiment.

The digital camera 70 including a printer selectively uses any one of two types of instant films 72 and 73 (see FIGS. 24 and 25). The first instant film 72 is, for example, a square-shaped instant film, and the second instant film 73 is, for example, a card type instant film. The second instant film 73 has a dimension in the X direction with respect to the first instant film 72, and has the same dimension in the Y direction. The first and second instant films 72 and 73 correspond to the film unit and the recording medium in the claims.

Any one of a first instant film pack 75 that accommodates the first instant film 72 or a second instant film pack 76 that accommodates the second instant film 73 is loaded into a loading room 74. A user selects one of the first and second instant film packs 75 and 76 that accommodate the first and second instant films 72 and 73 that the user wants to use and loads the selected film pack into the loading room 74.

Configuration of First Instant Film Pack

The first instant film pack 75 has the same configuration as the instant film pack 24 in the first embodiment. The first instant film 72 accommodated in the first instant film pack 75 has the same configuration as the instant film 28 in the first embodiment. A dimension of the first instant film pack 75 in the X direction (width direction) is formed to be larger than a dimension of the second instant film pack 76 in the X direction (width direction).

Configuration of Second Instant Film Pack

Figure 21:
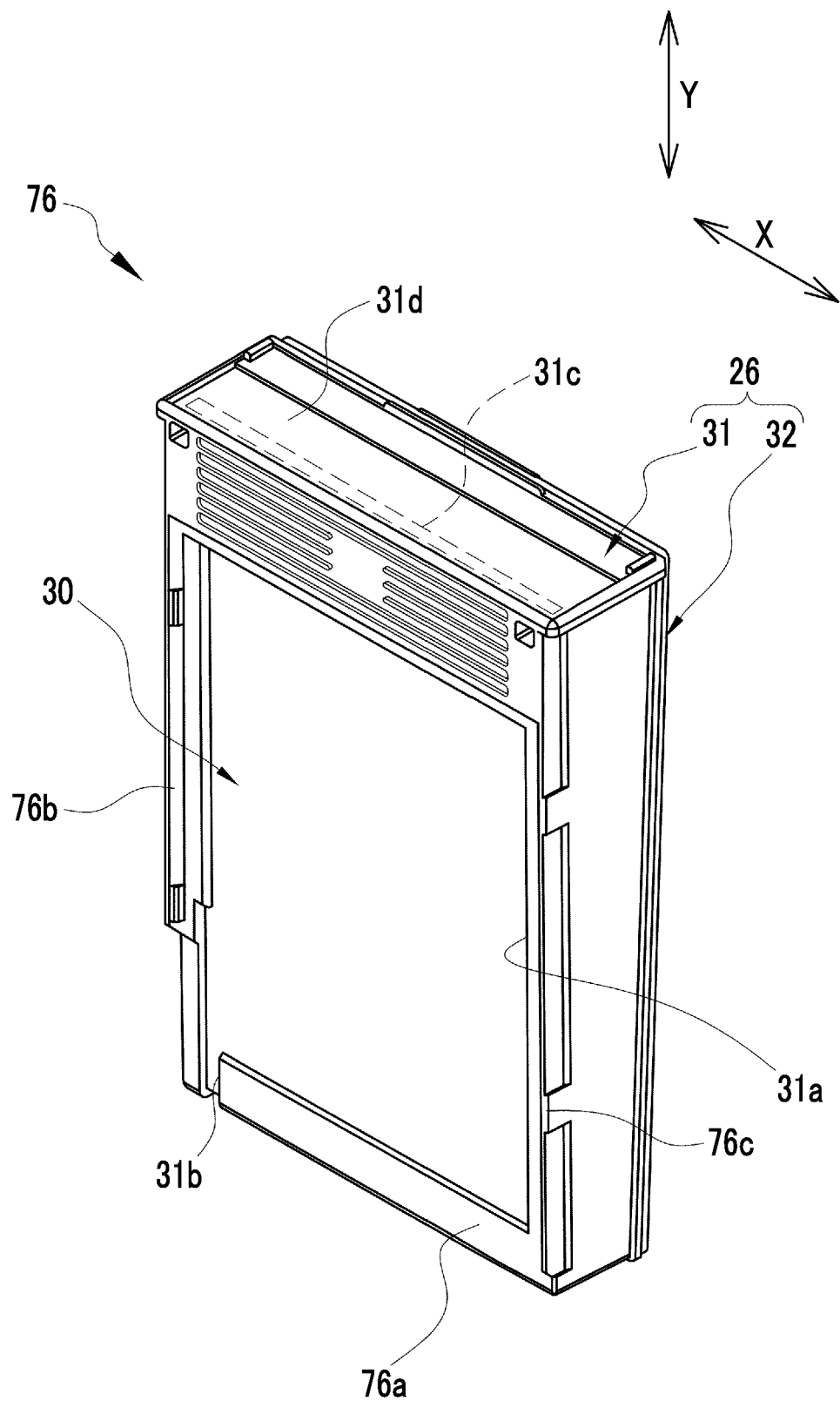
FIG. 21 is a perspective view of a second instant film pack in the second embodiment.

As shown in FIG. 21, although the second instant film pack 76 has the same basic configuration as the first instant film pack 75, since the types of the first and second instant films 72 and 73 to be accommodated are different, sizes thereof and locations at which positioning is performed are different. Hereinafter, locations having the same functions as the locations of the first instant film pack 75, that is, the instant film pack 24 in the first embodiment are given by the same reference numerals and the description thereof will be omitted.

The second instant film pack 76 comprises the case 26, the film press plate 27, a plurality of second instant films 73, and the film cover 30. As described above, the case 26, the film press plate 27, and the film cover 30 in the second instant film pack 76 have sizes that match the second instant film 73.

A pair of ribs 76b and 76c are provided on a front surface 76a of the second instant film pack 76. The ribs 76b and 76c are positioned on both sides of the exposure aperture 31a and extend in parallel with the Y direction (length direction) of the second instant film pack 76.

Configuration of Second Instant Film

The second instant film 73 is the same mono-sheet type film as the first instant film 72 except for a difference in size. Hereinafter, locations having the same functions as the locations of the first instant film 72, that is, the instant film 28 in the first embodiment are given by the same reference numerals and the description thereof will be omitted.

Configuration of Printer Unit

As shown in FIG. 22, the printer unit 71 includes the exposure unit 50 (see FIGS. 24 and 25), a device housing 81, a roller drive mechanism 82, a transport roller pair 83, a spreading roller pair 84, the spreading control member 55, the mechanical switch 56, the circuit board 57, the first metal member 58, the claw member 59, the claw member drive mechanism 61, and the controller 62. The transport roller pair 83 corresponds to a first roller pair in the claims, and the spreading roller pair 84 corresponds to a second roller pair in the claims.

Configuration of Positioning Portion of Loading Room

Figure 23:
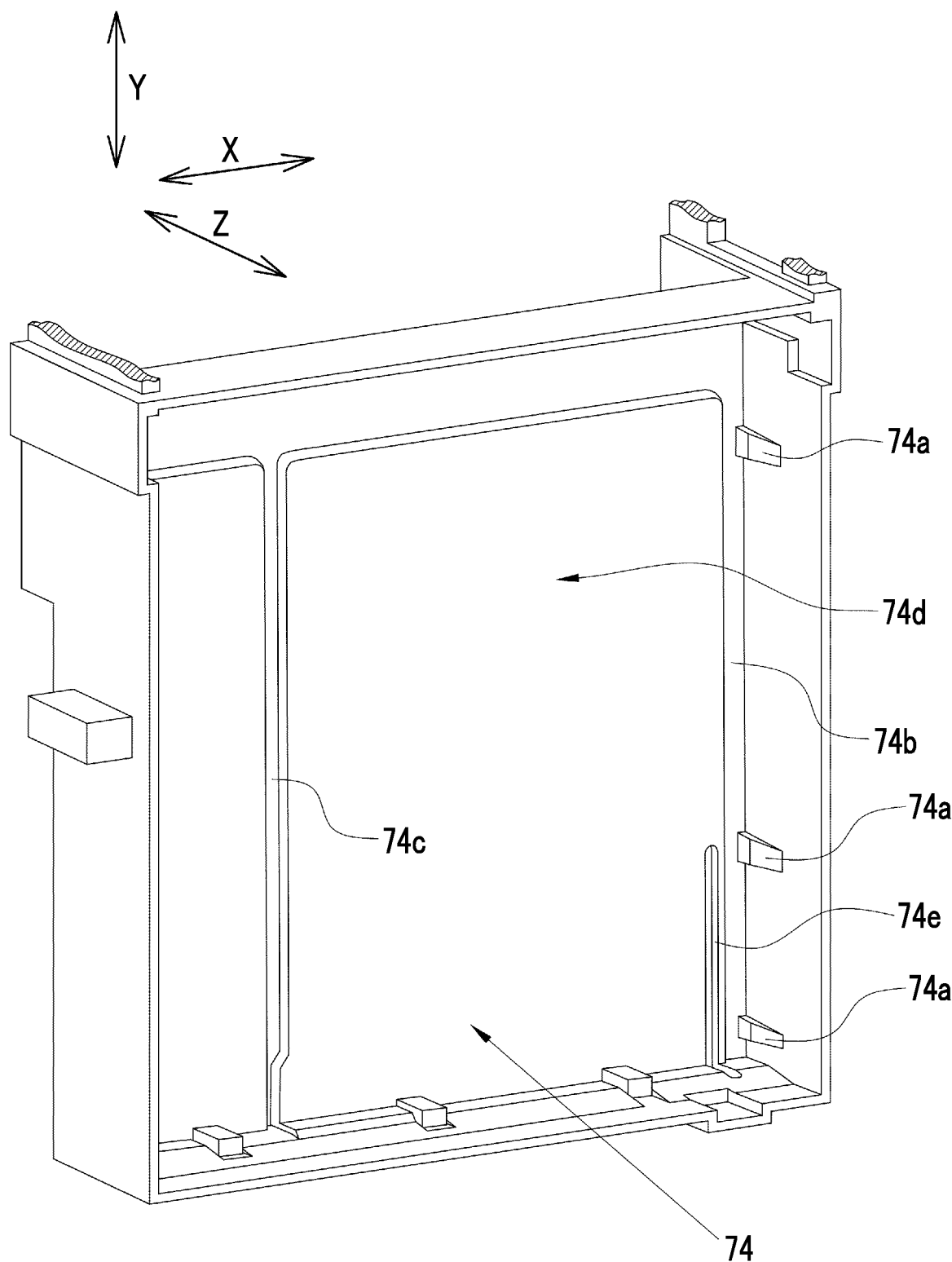
FIG. 23 is a perspective view of a device housing in the second embodiment.

As shown in FIG. 23, the loading room 74 is formed in a box shape in which the rear surface side of the camera body 11 is opened. Positioning protrusions 74a for positioning the first instant film pack 75 in the X direction are provided in the loading room 74.

The positioning protrusions 74a are provided on both side surfaces of the loading room 74. The positioning protrusions 74a are formed in a wedge shape in which a thickness gradually increases along a loading direction Z of the first instant film pack 75, that is, a front-rear direction of the camera body 11.

As described above, a dimension of the first instant film pack 75 in the X direction is formed to be larger than a dimension of the second instant film pack 76 in the X direction. Accordingly, both side surfaces of the first instant film pack 75 come into contact with the positioning protrusions 74a, and thus, the positioning in the X direction can be performed.

On the other hand, positioning grooves 74b and 74c for performing positioning in the X direction with respect to the second instant film pack 76 are provided in the loading room 74. The positioning grooves 74b and 74c are formed on a front surface 74d of the loading room 74 (a surface facing the exposure apertures 31a of the first and second instant film packs 75 and 76). The positioning groove 74b is disposed at a position near one side surface of the loading room 74. The positioning groove 74c is disposed at a position spaced apart from the positioning groove 74b at a predetermined interval. A width and an interval between the positioning grooves 74b and 74c correspond to a width and an interval between the ribs 76b and 76c of the second instant film pack 76.

The loading room 74 comprises a cut-off portion 74e. The cut-off portion 74e is formed at a position facing the cut-off portions 31b of the first and second instant film packs 75 and 76, and is continuous with a bottom surface of the loading room 74. The claw member 59 enters the inside of the first and second instant film packs 75 and 76 through the cut-off portion 74e, and the first and second instant films 72 and 73 are fed one by one outwards from the first and second instant film packs 75 and 76.

As described above, since the second instant film pack 76 has a smaller dimension in the X direction than the first instant film pack 75, the ribs 76b and 76c are fitted into the positioning grooves 74b and 74c positioned inside the loading room 74 in the X direction with respect to the positioning protrusion 74a, and thus, the positioning in the X direction can be performed. Specifically, the ribs 76b and 76c are fitted into the positioning grooves 74b and 74c, and thus, the position of the second instant film pack 76 in the X direction is shifted to one side surface side of the loading room 74. Accordingly, the positioning can be performed.

The first and second instant film packs 75 and 76 are loaded as described above, and the image is recorded by the printer unit 71 on the first and second instant films 72 and 73 discharged from the first and second instant film packs 75 and 76.

The transport roller pair 83 and the spreading roller pair 84 are driven to be rotated by the roller drive mechanism 82, and transport any one of the first instant film 72 or the second instant film 73. The roller drive mechanism 82 has the same configuration as the roller drive mechanism 52 in the first embodiment. In a case where two types of instant films having different dimensions in the width direction are used as in the present embodiment, the position of the second instant film pack 76 having the smaller dimension in the width direction is positioned by being shifted to one end side in the X direction. Accordingly, in order to efficiently transmit a drive force of the roller drive mechanism 82 to the first and second instant films 72 and 73 via the transport roller pair 83 and the spreading roller pair 84, it is preferable that the roller drive mechanism 82 is provided on one end side in the X direction.

The transport roller pair 83 includes a capstan roller 91 and a pinch roller 92. The capstan roller 91 and the pinch roller 92 are disposed at positions at which these rollers pinch the transport passage of the first and second instant films 72 and 73.

The capstan roller 91 is disposed on a side of the first and second instant films 72 and 73 facing the exposure surface. The capstan roller 91 includes a pair of columnar spike roller members 91a and 91b, a sub-roller member 91c, and a rotational shaft 91d that holds each spike roller member 91a and the sub-roller member 91c.

A spike including a plurality of small protrusions (convex portions) is formed on a circumferential surface of the spike roller member 91a. The sub-roller member 91c is formed in a smooth curved surface shape in which a cross section cut along a plane including an axial direction and a diametrical direction is convex outward. The pinch roller 92 is disposed on a side of the first and second instant films 72 and 73 facing the image observation surface. The pinch roller 92 includes a roller member 92a and a rotational shaft 92b.

The transport roller pair 83 transports the first and second instant films 72 and 73 fed from the first and second instant film packs 75 and 76 by the claw member 59 toward the spreading roller pair 84.

The spreading roller pair 84 includes spreading rollers 93 and 94, and is disposed on a downstream side of the transport roller pair 83 in the transport direction. The spreading roller 93 is disposed on a side of the first and second instant films 72 and 73 facing the exposure surface. The spreading roller 94 is disposed on a side of the first and second instant films 72 and 73 facing the image observation surface. A motor is connected to one end of a shaft end portion of the spreading roller 93 or 94 via a drive transmission gear train. Thus, in a case where a DC motor rotates, the spreading rollers 93 and 94 rotate in synchronization with each other.

The spreading roller pair 84 transports the first and second instant films 72 and 73 transported by the transport roller pair 83 toward the film feeding port 21 while pinching the instant films over the entire width. The developer pod 36 is crushed by being pinched between the spreading roller pair 84. Accordingly, the developer is spread (unfolded) into the gap 39.

Action of Positioning Portion

In a case where the first instant film pack 75 is loaded into the loading room 74, the positioning in the X direction is performed by the positioning protrusion 74a. That is, the first instant film 72 built in the first instant film pack 75 is positioned with respect to the transport roller pair 83 incorporated in the camera body 11.

As shown in FIG. 24, the pair of spike roller members 91a and 91b are disposed at intervals from each other so as to correspond to the dimension of the first instant film 72 in the X direction. In a case where the transport roller pair 83 transports the first instant film 72, the first instant film 72 is positioned at a position where both side edge portions of the first instant film 72 are in slidably contact with the pair of spike roller members 91a and 91b, respectively, especially by the positioning of the positioning protrusions 74a in the X direction. Accordingly, the transport roller pair 83 can transport the first instant film 72 toward the spreading roller pair 84.

On the other hand, in a case where the second instant film pack 76 is loaded into the loading room 74, the positioning in the X direction is performed by the positioning grooves 74b and 74c. That is, the second instant film 73 built in the second instant film pack 76 is positioned with respect to the transport roller pair 83 incorporated in the camera body 11.

As shown in FIG. 25, the sub-roller member 91c is disposed at an interval with respect to one spike roller member 91b so as to correspond to the dimension of the second instant film 73 in the X direction.

As described above, the second instant film pack 76 is positioned with the loading room 74 so as to be shifted to one side surface. Thus, in a case where the transport roller pair 83 transports the second instant film 73, the second instant film 73 is positioned so as to correspond to the position where one side edge portion of the second instant films 73 is in slidably contact with one spike roller member 91b and so as to correspond to the position where the other side edge portion of the second instant film 73 is in slidably contact with the sub-roller member 91c by the positioning of the positioning grooves 74b and 74c especially in the X direction. Accordingly, since the spike roller member 91b securely holds one side edge portion of the second instant film 73 and the other side edge portion and the sub-roller member 91c are in slidably contact with each other, the second instant film 73 can be transported toward the spreading roller pair 84.

Configuration of Mechanical Switch

The mechanical switch 56 is positioned near the spreading control member 55 as in the first embodiment. As shown in FIG. 25, the mechanical switch 56 is disposed so as to correspond to a position of a center CL2 of the second instant film 73 in the X direction. The mechanical switch 56 is positioned 3 mm or more inside in the X direction with respect to side ends 72a and 72b of the first instant film 72, and is positioned 3 mm or more inside in the X direction with respect to side ends 73a and 73b of the second instant film 73.

As for the first and second instant films 72 and 73, similarly to the instant film 28 in the first embodiment, chamfered portions 72d and 72e are formed at positions where a distal end 72c and the side ends 72a and 72b intersect in the first instant film 72, and chamfered portions 73d and 73e are formed at positions where a distal end 73c and the side ends 73a and 73b intersect in the second instant film 73. The chamfered portions 72d and 72e and the chamfered portions 73d and 73e are formed at positions within 1 mm with respect to the side ends 72a and 72b and the side ends 73a and 73b. That is, the mechanical switch 56 is positioned inside the chamfered portions 72d and 72e and the chamfered portions 73d and 73e.

The mechanical switch 56 is turned on by being pressed by the distal end 72c of the first instant film 72 or the distal end 73c of the second instant film 73. The turned-on mechanical switch 56 outputs a signal to the controller 62. The controller 62 that receives the signal from the mechanical switch 56 counts a predetermined number as in the first embodiment. In a case where the controller 62 counts the predetermined number, a distal end of the exposure surface of the first instant film 72 or a distal end of the exposure surface of the second instant film 73 reaches the exposure position P. The controller 62 drives the exposure unit 50 to start the exposure of the image to the first instant film 72 or the second instant film 73. In this case, the controller 62 may change the exposure range of the exposure unit 50 so as to correspond to the dimension of the first instant film 72 in the X direction or the dimension of the second instant film 73 n the X direction. The circuit board 57, the first metal member 58, the exterior member 56A of the mechanical switch 56, and the like will not be described, but have the same configurations and dispositions as those in the first embodiment and also have the same effects.

Action of Printer Unit

As described above, the mechanical switch 56 is positioned near the spreading control member 55 as in the first embodiment. Accordingly, the distal ends of the first and second instant films 72 and 73 can be accurately detected. That is, the same effects as those of the first embodiment can be obtained. The mechanical switch 56 is positioned 3 mm or more inside in the X direction with respect to the side ends 72a and 72b of the first instant film 72, and is positioned 3 mm or more inside in the X direction with respect to the side ends 73a and 73b of the second instant film 73. Even in this point, the same effect as the first embodiment can be obtained.

Figure 26:
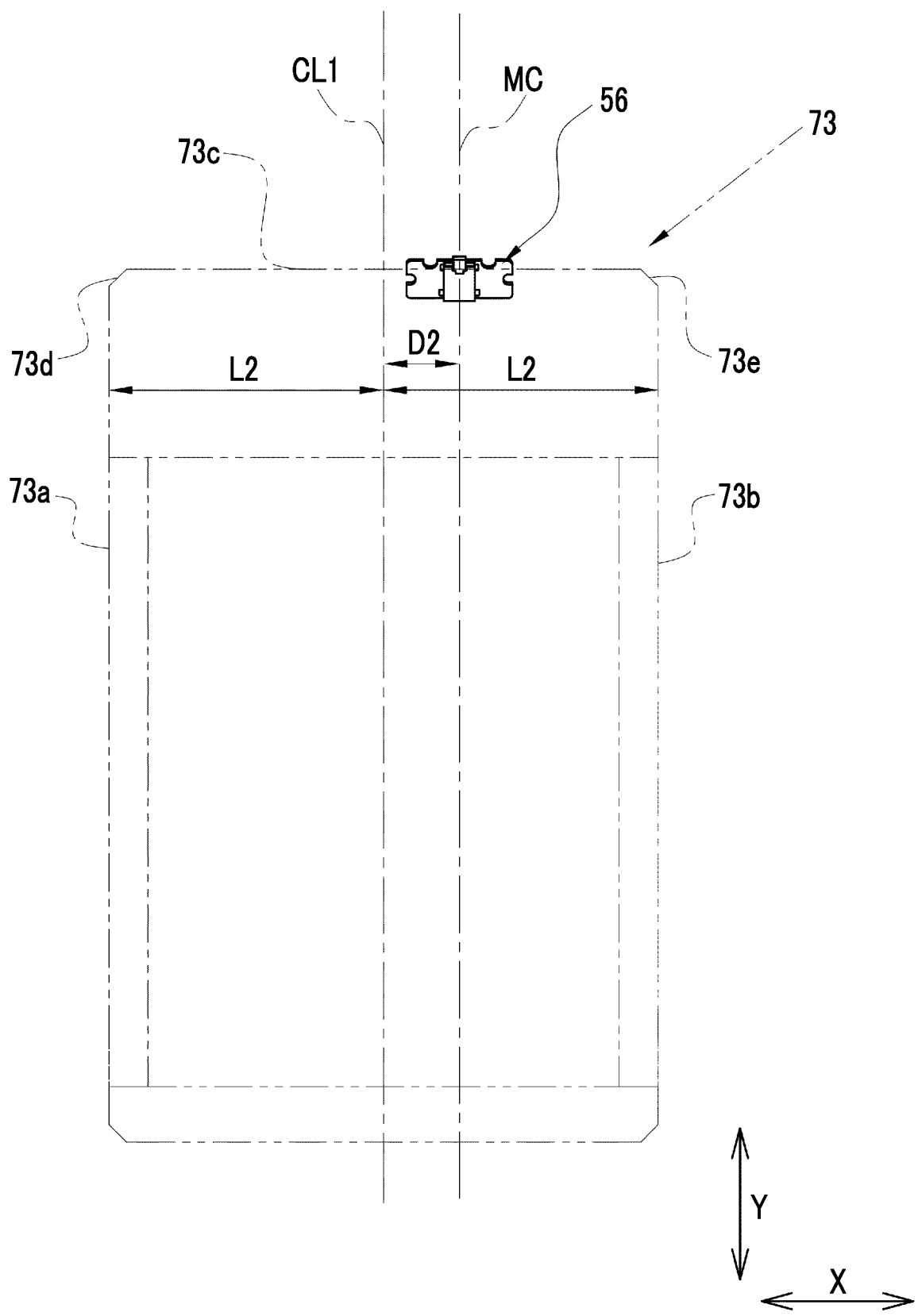
FIG. 26 is an explanatory diagram showing a positional relationship between a mechanical switch and a second instant film being transported in a modified example of the second embodiment.

As shown in FIG. 26, in a case where a dimension from the position of the center CL2 of the second instant film 73 in the X direction to the side ends 73a and 73b is L2 and a distance from the position of the center CL2 of the second instant film 73 in the X direction to the position of the center MC of the mechanical switch 56 is D2, it is preferable that the mechanical switch 56 is disposed at a position where 0≤D2≤0.3 L2.

In each of the above embodiments, although a mono-sheet type instant film is exemplified as the sheet-shaped recording medium, the present invention is not limited thereto. Any recording medium may be used, for example, thermal paper, inkjet paper, or the like may be used. In a case where the recording medium is the thermal paper, the printer is a thermal printer, and in a case where the recording medium is the inkjet paper, the printer is an inkjet printer. In each of the above embodiments, although the example in which the present invention is applied to the digital camera including a printer is used, the present invention is not limited thereto, and the present invention may be applied to a single printer.

In the above embodiment, a hardware structure of a processing unit that executes various kinds of processing such as the controller 62 includes various processors to be described below. The various processors include a central processing unit (CPU) which is a general-purpose processor that functions as various processing units by executing software (program), a graphical processing unit (GPU), a programmable logic device (PLD) such as a field programmable gate array (FPGA) which is a processor capable of changing a circuit configuration after manufacture, a dedicated electric circuit which is a processor having a circuit configuration specifically designed to execute various processing, and the like.

One processing unit may be constituted by one of these various processors, or may be constituted by a combination of two or more processors of the same type or different types (for example, a combination of a plurality of FPGAs, a combination of a CPU and an FPGA, a combination of a CPU and a GPU, or the like). The plurality of processing units may be constituted by one processor. As an example in which the plurality of processing units are constituted by one processor, firstly, one processor is constituted by a combination of one or more CPUs and software as represented by computers such as clients and servers, and this processor functions as the plurality of processing units. Secondly, a processor that realizes the functions of the entire system including the plurality of processing units via one Integrated Circuit (IC) chip is used as represented by a system on chip (SoC). As described above, the various processing units are constituted by using one or more of the various processors as the hardware structure.

Further, more specifically, an electric circuitry in which circuit elements such as semiconductor elements are combined can be used as the hardware structure of these various processors.

EXPLANATION OF REFERENCES

- 10: digital camera including printer
- 11: camera body
- 12: imaging unit
- 13: printer unit
- 15: imaging window
- 16A, 16B: release switch
- 17: rear display unit
- 18: operating part
- 18a: menu switch
- 18b: print switch
- 19: imaging optical system
- 20: solid-state imaging element
- 21: film feeding port
- 22: loading lid
- 22a to 22d: film holding portion
- 22e: hinge portion
- 23, 74: loading room
- 23a: slit
- 23b: front surface
- 24: instant film pack
- 26: case
- 27: film press plate
- 27a: sheet
- 27b: sheet
- 27c: opening
- 27d: pair of holes
- 27e: opening
- 27f: pair of holes
- 27g: lower end portion
- 27h: lower end portion
- 28: instant film
- 28a: exposure surface
- 28a, 28b: side end
- 28c: distal end
- 28d, 28e: chamfered portion
- 30: film cover
- 31: case member
- 31a: exposure aperture
- 31b: cut-off portion
- 31c: feeding port
- 31d: light shielding seal
- 32: cover
- 32a: opening
- 32b: unit support protrusion
- 32c: caulking pin
- 32d: support piece
- 33: mask sheet
- 33a: screen opening
- 34: photosensitive sheet
- 35: cover sheet
- 36: developer pod
- 37: trap portion
- 38: developer
- 39: gap
- 40: image observation surface
- 50: exposure unit
- 51: device housing
- 51A: attachment surface
- 51B: recess
- 52: roller drive mechanism
- 53: transport roller pair
- 54: spreading roller pair
- 55: spreading control member
- 56: mechanical switch
- 56A: exterior member
- 56B: pressed portion
- 57: circuit board
- 58: first metal member
- 58A: fixed piece
- 58B: contact piece
- 58C: protrusion piece
- 58D: hole portion
- 59: claw member
- 59a: distal end portion
- 61: claw member drive mechanism
- 62: controller
- 65: capstan roller
- 65a: spike roller member
- 65b: drive gear
- 65c: rotational shaft
- 66: pinch roller 66a: roller member
66b: drive gear
66c: rotational shaft
67: spreading roller
68: spreading roller
70: digital camera including printer
71: printer unit
72: first instant film
72a, 72b: side end
72c: distal end
72d, 72e: chamfered portion
73: second instant film
73a, 73b: side end
73c: distal end
73d, 73e: chamfered portion
74: loading room
74a: positioning protrusion
74b, 74c: positioning groove
74d: front surface
74e: cut-off portion
75: first instant film pack
76: second instant film pack
76a: front surface
76b, 76c: rib
81: device housing
82: roller drive mechanism
83: transport roller pair
84: spreading roller pair
91: capstan roller
91a: spike roller member
91b: spike roller member
91c: sub-roller member
91d: rotational shaft
92: pinch roller
92a: roller member
92b: rotational shaft
93: spreading roller
94: spreading roller
CL1: center
CL2: center
D1: distance
D2: distance
IL1, IL2: broken line
L1: dimension
L2: dimension
MC: center
P: exposure position
X, Y, Z: direction

What is claimed is:

1. A printer comprising:
a transport roller pair that transports a film unit including a developer pod containing a developer;
an exposure unit that exposes an image onto the film unit transported by the transport roller pair;
a spreading roller pair that is disposed on a downstream side in a transport direction with respect to the transport roller pair and spreads the developer into a gap of the film unit by crushing the developer pod of the exposed film unit;
a spreading control member that is positioned between the transport roller pair and the spreading roller pair in the transport direction, extends in a width direction of the film unit, and controls the developer spread into the gap of the film unit by rubbing the film unit;
a mechanical switch that is positioned on a side opposite to the spreading control member with a transport passage of the film unit and positioned between the transport roller pair and the spreading roller pair, wherein the mechanical switch is turned on by being pressed by a distal end of the film unit; and
a first metal member that is positioned on a side opposite to the spreading control member with a transport passage of the film unit, and elastically presses the film unit against the spreading control member.

2. The printer according to claim 1,
wherein the first metal member is electrically connected to a ground circuit of the mechanical switch.

3. The printer according to claim 2,
wherein the mechanical switch has a second metal member fixed to the ground circuit, and
the first metal member is electrically connected to the ground circuit by coming into contact with the second metal member.

4. The printer according to claim 1,
wherein a first film unit and a second film unit having a smaller dimension in the width direction than the first film unit are used as the film units, and
the transport roller pair transports any one of the first film unit or the second film unit.

5. The printer according to claim 4, further comprising:
a roller drive mechanism that drives the transport roller pair and the spreading roller pair,
wherein the roller drive mechanism is provided at one end in the width direction.

6. The printer according to claim 1,
wherein the mechanical switch is positioned 3 mm or more inside a side end of the film unit in the width direction.

7. The printer according to claim 1,
wherein a chamfered portion is formed at a position where a distal end in the transport direction and a side end in the width direction intersect in the film unit, and
the mechanical switch is positioned inside the chamfered portion of the film unit in the width direction.

8. The printer according to claim 1,
wherein, in a case where a dimension from a center position to a side end of the film unit in the width direction is L and a distance from the center position of the film unit to a center position of the mechanical switch in the width direction is D, the mechanical switch is disposed at a position where $0 \leq D \leq 0.3\,L$.

9. A printer comprising:
a first roller pair that transports a recording medium;
a second roller pair that is disposed on a downstream side in a transport direction with respect to the first roller pair; and
a mechanical switch that is positioned between the first roller pair and the second roller pair in the transport direction and is turned on by being pressed by a distal end of the recording medium.

10. A digital camera including a printer comprising:
the printer according to claim 1; and
an imaging unit that includes an imaging optical system and images a subject image to output image data to the printer.

* * * * *